US012047629B2

United States Patent
Dimkovic et al.

(10) Patent No.: US 12,047,629 B2
(45) Date of Patent: Jul. 23, 2024

(54) STREAMING TECHNIQUES

(71) Applicant: Cinemo GmbH, Karlsruhe (DE)

(72) Inventors: Ivan Dimkovic, Karlsruhe (DE); Richard Lesser, Karlsruhe (DE); Enrik Berkhan, Stutensee (DE)

(73) Assignee: CINEMO GMBH, Karlsruhe (DE)

( * ) Notice: Subject to any disclaimer, the term of this patent is extended or adjusted under 35 U.S.C. 154(b) by 231 days.

(21) Appl. No.: 17/829,715

(22) Filed: Jun. 1, 2022

(65) Prior Publication Data
US 2022/0292164 A1    Sep. 15, 2022

Related U.S. Application Data

(63) Continuation of application No. PCT/EP2020/085371, filed on Dec. 9, 2020.

(30) Foreign Application Priority Data

Dec. 9, 2019   (EP) .................................... 19214605

(51) Int. Cl.
*H04N 21/414*    (2011.01)
*G06F 21/10*      (2013.01)
(Continued)

(52) U.S. Cl.
CPC ..... *H04N 21/41422* (2013.01); *H04N 21/214* (2013.01); *H04N 21/4307* (2013.01);
(Continued)

(58) Field of Classification Search
CPC ..... G06F 21/10; H04N 21/214; H04N 21/422
See application file for complete search history.

(56) References Cited

U.S. PATENT DOCUMENTS 5,825,879 A    10/1998  Davis
9,418,209 B2 *  8/2016  Mangalore .............. G06F 21/60
(Continued)

FOREIGN PATENT DOCUMENTS

EP   3 565 265 A1    11/2019
JP   2013-538486 A   10/2013
WO   2012/048928 A1   4/2012

OTHER PUBLICATIONS

International Search Report and Written Opinion issued in application No. PCT/EP2020/085371.
(Continued)

*Primary Examiner* — Viral S Lakhia
(74) *Attorney, Agent, or Firm* — McClure, Qualey & Rodack, LLP

(57) ABSTRACT

There are disclosed distributed playback, DP, techniques. For examples a DP master device, may: establish a local connection with a plurality of DP client devices and for establishing a remote connection with a remote content provider, so as to receive a first encrypted media stream from the remote content provider; decrypt the first encrypted media stream to obtain a decrypted media stream; adding DP information, DPI, to the decrypted media stream; encrypting the decrypted media stream according to a second encryption standard to obtain a second encrypted stream; additionally encrypting the DPI in the second encrypted media stream or adding the DPI to the encrypted media stream in plaintext, transmitting an output media stream, which is the second encrypted media stream, to the plurality of DP client devices.

24 Claims, 18 Drawing Sheets

(51) Int. Cl.
  *H04N 21/214* (2011.01)
  *H04N 21/43* (2011.01)
  *H04N 21/4363* (2011.01)
  *H04N 21/4405* (2011.01)

(52) U.S. Cl.
  CPC ..... *H04N 21/4363* (2013.01); *H04N 21/4405* (2013.01); *G06F 21/1062* (2023.08)

(56) References Cited

U.S. PATENT DOCUMENTS

| | | | | |
|---|---|---|---|---|
| 9,420,317 | B2* | 8/2016 | McCarthy | H04N 21/2385 |
| 9,538,254 | B2* | 1/2017 | Russell | H04N 21/6332 |
| 9,607,657 | B2* | 3/2017 | Russell | H04N 21/4344 |
| 10,754,930 | B2* | 8/2020 | Brockmann | H04L 9/3265 |
| 11,729,469 | B2* | 8/2023 | Lesser | H04N 21/440263 |
| | | | | 725/31 |
| 2012/0020475 | A1 | 1/2012 | Altmann | |
| 2016/0050244 | A1* | 2/2016 | Corlett | H04L 65/612 |
| | | | | 709/231 |
| 2016/0309206 | A1* | 10/2016 | Amidei | H04L 65/70 |
| 2018/0359508 | A1* | 12/2018 | Lindgren | H04N 21/4305 |

OTHER PUBLICATIONS

Widevine; "Widevine L1 and L3 standards;" Version 1.2; Mar. 2017; pp. 1-28.
Screenshot of HDCP standard; https://www.digital-cp.com/hdcp-specifications; pp. 1.
Japanese language office action dated Sep. 5, 2023, issued in application No. JP 2022-535056.
English langauge translation of office action dated Sep. 5, 2023 (pp. 8-13 of attachment).

* cited by examiner

STREAMING TECHNIQUES

CROSS-REFERENCE TO RELATED APPLICATIONS

This application is a continuation of copending International Application No. PCT/EP2020/085371, filed Dec. 9, 2020, which is incorporated herein by reference in its entirety, and additionally claims priority from European Application No. EP 19214605.8, filed Dec. 9, 2019, which is also incorporated herein by reference in its entirety.

The present examples mainly refer to systems, methods, apparatus and techniques (e.g., streaming techniques) for transmitting media streams (e.g., audio streams and/or video streams), obtained from a remote content provider, to local client devices. The techniques may in particular be applied to infotainment equipment, e.g. for vehicles (e.g. cars).

BACKGROUND OF THE INVENTION

Streaming techniques may permit to transmit media content from a remote content provider to a plurality of client devices through a media server. The media server may be, for example, a front passenger head unit. The media server may also be adapted to reproduce media content by means of its own output devices, such as displays and/or speakers. Different client devices (such as rear passenger units) disseminated in a physical environment (e.g., a vehicle) may be provided with a media stream to be reproduced.

Wired connections and wireless connections are known, e.g. for connecting the media server to the client devices. The latter are in general less expensive, less complicated, and easier to be composed.

However, some issues have been experienced both with wired and wireless solutions. At first, issues of security arise: illegally obtaining media signals can occur. There has been tried to reduce this inconvenience by introducing encryption-based techniques.

However, a weak point has been recognized in that, while theoretically the media server can simply relay the encrypted streams to all the client devices, this in practice causes a lack of synchronization between the signal as provided at the output units (speakers, displays ... ) of the client devices and the output units embedded or internal to the server. For example, encryption and decryption need a non-zero amount of time, which causes the delay of the reproduction of the media content of the client devices with respect to the reproduction of the media content by the output devices of the media server.

Hence, there are pursed solutions for increasing the synchronization between the devices (server and clients).

Other issues have been arisen for some specific classes of systems. Certifications have been developed which permit to guarantee, at a specific level of security, that the media content (or at least a part thereof) is directly provided to the output unit (e.g., display), with low possibility for a user of illegally obtaining a media signal. Certified hardware and software have therefore been marketed. Many of these solutions are based on different encryption techniques (most of which have been standardized, to permit the use to a broad class of devices). However, not all the encryption-based techniques and the certifications provide the same level of security: new techniques and certifications have been developed during time. This implies that, in case streams are provided by a server according to a new standard, pre-existing devices should be replaced by new devices which support the new standard, thus increasing costs, or in best cases they should be reconfigured, thus increasing the complications. A certified environment tends to be a closed "black box", as it implements techniques aimed at discouraging the connection to its input ports and output ports: as it is intended to avoid any possible hacking, the possibility of processing the decrypted streams at the client level are rendered complicated.

Also in this case, some solutions are needed for the sake of simplification and for increasing security.

SUMMARY

According to an embodiment, a distributed playback, DP, master device, may have: a communication interface configured for establishing a local connection with a plurality of DP client devices and for establishing a remote connection with a remote content provider, so as to receive a first encrypted media stream from the remote content provider, wherein the first encrypted media stream is encrypted according to a first encryption standard, wherein the first encrypted media stream includes at least one audio stream and at least one video stream; a decryptor configured for decrypting the first encrypted media stream to obtain a decrypted media stream; a DP information, DPI, adder configured for adding DPI to the decrypted media stream, an encryptor configured for encrypting the decrypted media stream according to a second encryption standard to obtain a second encrypted stream, wherein the second encryption standard is the same as, or different from, the first encryption standard, wherein the DP master device is configured for additionally encrypting the DPI in the second encrypted media stream or adding the DPI to the second encrypted media stream in plaintext, wherein the communication interface is configured for transmitting an output media stream, which is the second encrypted media stream, to the plurality of DP client devices, wherein the DP master device includes a trusted environment and a non-trusted environment, wherein the trusted environment has a level of security which is greater than the level of security of the non-trusted environment, wherein the decryptor and the encryptor are in the trusted environment, the DP master device further including an embedded media renderer which has a trusted renderer portion in the trusted environment and a non-trusted renderer portion in the non-trusted environment, so that a first media content, which is video content, is rendered by the trusted renderer portion and a second media content, which is audio content, is rendered by the non-trusted environment, wherein the first media content and the second media content are decoded from the decrypted media stream, wherein the first media content is synchronized to the second media content through the DPI.

According to another embodiment, a distributed playback, DP, method may have the steps of: establishing a local connection with a plurality of DP client devices; establishing a remote connection with a remote content provider, so as to receive a first encrypted media stream from the remote content provider, wherein the first encrypted media stream is encrypted according to a first encryption standard, wherein the first encrypted media stream includes at least one audio stream and at least one video stream; decrypting the first encrypted media stream to obtain a decrypted media stream; adding DP information, DPI, to the decrypted media stream; an encryptor configured for encrypting the decrypted media stream according to a second encryption standard to obtain a second encrypted stream, additionally encrypting the DPI in the second encrypted media stream or adding the DPI to the second encrypted media stream in plaintext, transmitting an output media stream, which is the second encrypted media stream, to the plurality of DP client devices, the method using an embedded media renderer which has a trusted renderer portion in the trusted environment and a non-trusted renderer portion in the non-trusted environment, so that a first media content, which is video content, is rendered by the trusted renderer portion, and a second media content, which is audio content, is rendered by the non-trusted environment, wherein the first media content and the second media content are decoded from the decrypted media stream, wherein the first media content is synchronized to the second media content through the DPI, wherein encrypting is performed within the trusted environment.

In accordance to an example there is provided a distributed playback, DP, master device, comprising: a communication interface configured for establishing a local connection with a plurality of DP client devices and for establishing a remote connection with a remote content provider, so as to receive a first encrypted media stream from the remote content provider, wherein the encrypted media stream is encrypted according to a first encryption standard; a decryptor configured for decrypting the first encrypted media stream to obtain a decrypted media stream; a DP information, DPI, adder configured for adding DPI to the decrypted media stream; an encryptor configured for encrypting the decrypted media stream according to a second encryption standard to obtain a second encrypted stream, wherein the second encryption standard is the same as, or different from, the first encryption standard, wherein the DP master device is configured for additionally encrypting the DPI in the second encrypted media stream or adding the DPI to the encrypted media stream in plaintext, wherein the communication interface is configured for transmitting an output media stream, which is the second encrypted media stream, to the plurality of DP client devices.

In accordance to an example there is provided a distributed playback, DP, master device, comprising: a communication interface configured for establishing a local connection with a plurality of DP client devices and for establishing a remote connection with a remote content provider, so as to receive a encrypted media stream from the remote content provider, wherein the encrypted media stream is encrypted according to a first encryption standard; a decryptor configured for decrypting the first encrypted media stream to obtain a decrypted media stream; DP information, DPI, adder configured for adding DPI to the decrypted media stream; wherein the DP master device is configured for additionally adding the DPI to the decrypted media stream, wherein the communication interface is configured for transmitting an output media stream to the plurality of DP client devices.

In accordance to an example there is provided a distributed playback, DP, client device, comprising: a DP communication interface configured for establishing a local connection with a DP master device, so as to receive an encrypted media stream from the DP master device, the decrypted media stream including payload data and DP information, DPI; a DP client decryptor configured for decrypting the encrypted media stream to obtain a decrypted media stream to obtain a decrypted media stream; a DPI extractor configured for extracting the DPI in the decrypted media stream or in the encrypted media stream; a DP client decoder configured for decoding the decrypted media stream using the DPI.

In accordance to an example there is provided a system including at least one DP master device according to any of the preceding examples, and a plurality of DP client devices, and a vehicle including the system.

In accordance to examples, there are also provided methods according to the claims (e.g., to be performed by the DP master device and/or the DP client device).

BRIEF DESCRIPTION OF THE DRAWINGS

Embodiments of the present invention will be detailed subsequently referring to the appended drawings, in which:

FIG. 1b shows the server device of FIG. 1a.

FIG. 1c shows a client device of FIG. 1a.

FIG. 2 shows a partition of a local system such as the local system of FIG. 1a.

FIG. 3b shows the server device of FIG. 3a.

FIG. 3c shows a client device of FIG. 3a.

FIG. 4 shows a partition of a local system such as the local system of FIG. 3a.

DETAILED DESCRIPTION OF THE INVENTION

General Examples

Figure 5:
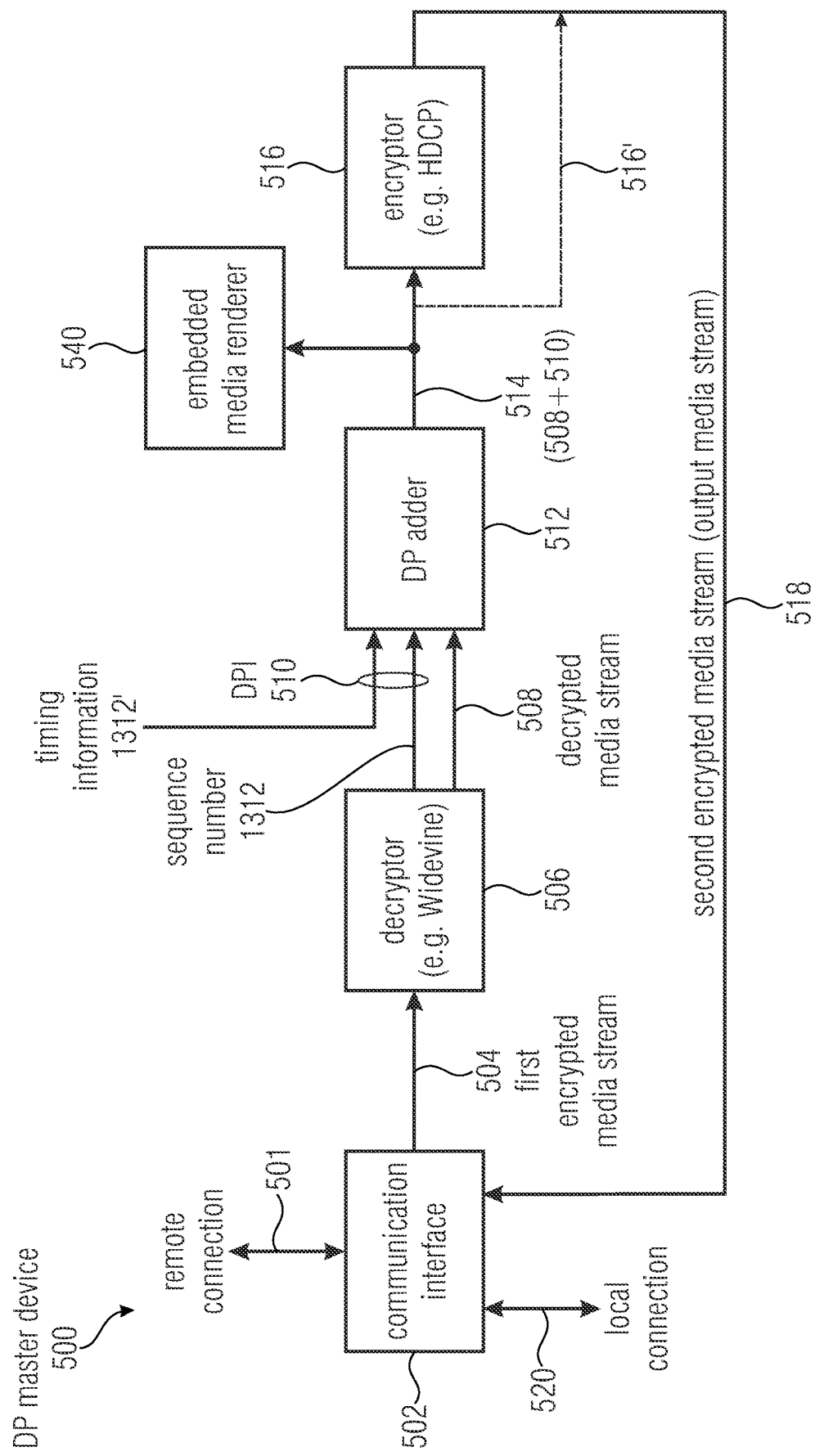
FIG. 5 shows a server device according to an example.
Figure 6:
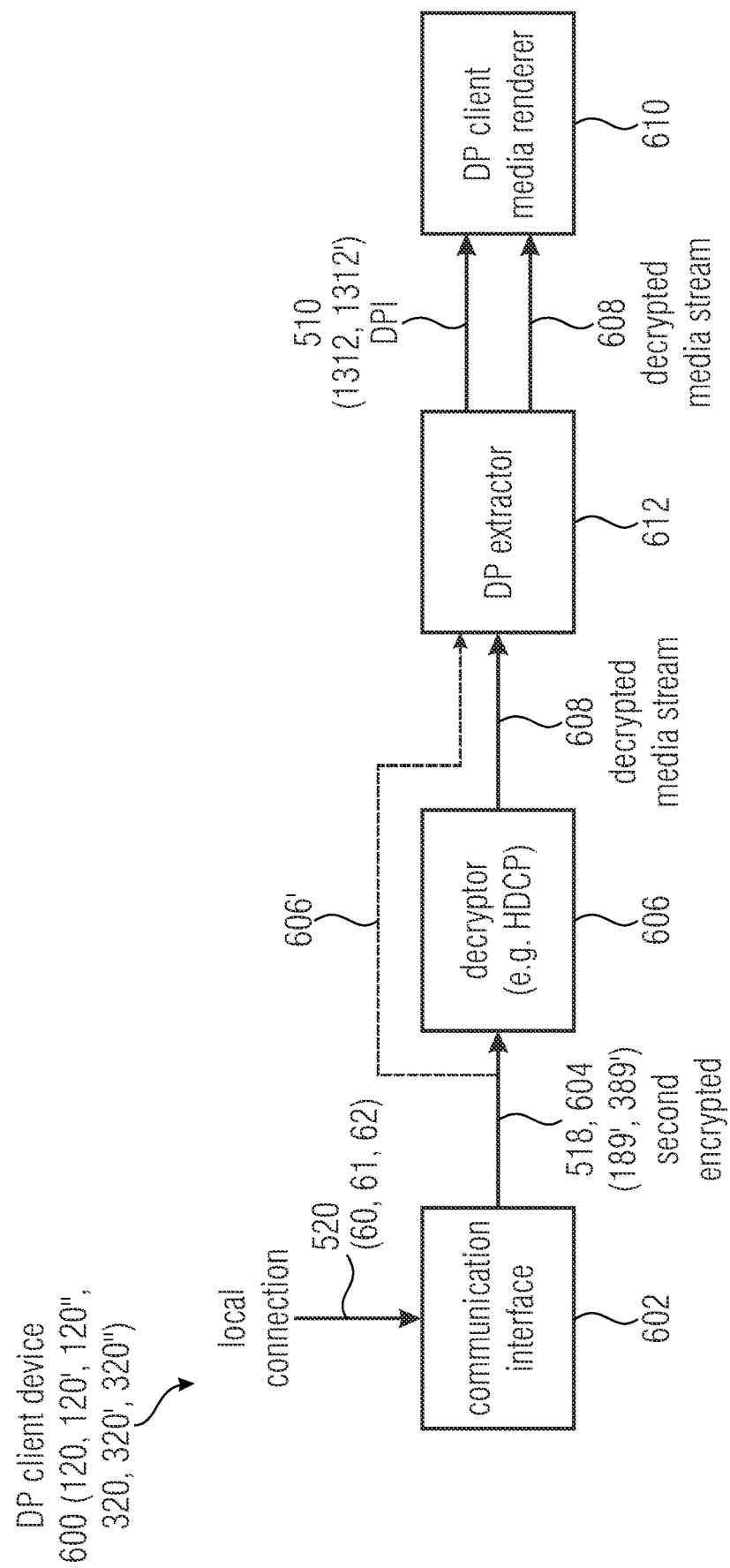
FIG. 6 shows a client device according to an example.

FIG. 5 shows an example of a distributed playback (DP master device 500). The DP master device 500 may comprise, for example, a communication interface 502 configured for establishing a local connection 520 with a plurality of DP client devices 600 (not shown in FIG. 5 but one of them is shown in FIG. 6; see also FIGS. 1c and 3c) and for establishing a remote connection 501 with a remote content provider (CP) 50. The communication interface 502 may include, or be embodied by, one or a plurality of units or devices of functional blocks.

The local connection 520 may be a wireless connection (e.g. through a WiFi connection, Bluetooth connection, etc.), thus reaching a DP session with the plurality of client devices 600. The local connection 520 may be a wired connection. For example, the local connection 520 may be obtained through a wired local area network (LAN). In some examples, some client devices 600 may be connected wirelessly (e.g. through a gateway), while some other client devices may be connected through a wired connection.

The remote connection 501 may be a remote wireless connection. The remote wireless connection may be obtained, for example, through a 3G, or 4G, or 5G, or a long-time evolution (LTE) connection. A wireless modem may therefore be provided. The remote connection may be performed, for example, through a mobile communication network with geographical coverage. In addition or alternatively, the remote connection 501 may be (totally or partially) a wired remote connection, which, for example, may make use of a fixed telephone network.

The communication interface 502 may occupy one single unit or may be part of multiple units, or may occupy partition(s) of one unit or a plurality of untis. The communication interface 502 may include hardware and/or software. The communication interface 502 may include or be connected to one or more antenna connection(s), modem connection(s), and other equipment for communication.

The communication interface 502 may receive from the content provider 50 a first encrypted media stream 504 through the remote connection 501. The communication interface 502 may therefore obtain a first encrypted media stream 504. The first encrypted media stream 504 may be such that it is virtually impossible (to a reasonable degree of certainty) to be decrypted without authorization.

The DP master device 500 may include a decryptor 506. The decryptor 506 may be configured for decrypting the first encrypted media stream 504. For example, the decryptor 506 may make use of keys, which permit to decrypt the first encrypted media stream 504. The decryptor 506 may obtain a decrypted media stream 508 (e.g. in plaintext). The media stream is, in general, encoded (e.g. compressed) and to be decoded (e.g. decompressed) before being actually rendered. The decrypted media stream 508 may be provided to an encryptor 516 (fist encryptor). The encryptor 516 may encrypt the decrypted media stream 508 according to a second standard. The second standard may be the same as the first standard through which the encrypted stream 504 had been originally encrypted. In alternative, second standard may be different than the first standard through which the encrypted stream 504 had been originally encrypted. In some examples, the first standard is Widevine and the second standard is high-bandwidth digital content protection (HDCP).

The encrypted media stream 518, when encrypted at encryptor 516 according to the second standard, may be provided, as output media stream, to the communication interface 502 and distributed to the plurality of client devices through the local connection 520.

The DPI master device 500 may embed a media renderer 540, for decoding and playing back the decrypted media stream 508.

It has been understood that it is advantageous to include in the DP master device 500 a distributed playback information (DPI) adder 512. The DPI adder 512 may add additional information 510, which may be at least partially obtained from the decrypted media stream 508 and may also contain timing information 1312'. Here, the decrypted media stream 508, when associated with the DPI 510, is indicated with 514. The DPI 510 may include, for example, timing information associated with at least one frame of the decrypted media stream 508. The DPI 510 may include, for example, a timing information providing presentation time information on the time instant in which the at least one frame is (or is scheduled to be) presented. The DPI 510 may, therefore, permit synchronization between DP client devices 600 with each other and/or with the DP master device 500. FIG. 6 shows the DPI 510 as including at least a sequence number 1312 which indicates the position of a particular frame (e.g. sample) in the sequence of the decrypted stream 508, and timing information 1312' (or more in particular the presentation time information) associated with at least one frame indicated by the sequence number 1312. (In some examples the sequence number is not necessarily part of the DPI, since other techniques may be used for identifying the frame to which the timing information 1312' is to be associated).

It is noted that, in some first embodiments, the DPI 510 may be encrypted by the encryptor 516 together with the media stream 508 (and the second encrypted media stream 518 contains, encrypted therein, the DPI 510 in encrypted form). In some second embodiments, the DPI 510 may remain unencrypted in the second encrypted media stream 518. In this last case, the encryptor 516 may simply refrain from encrypting the DPI 518 (which therefore remains in plaintext), or the addition of the DPI 510 in plaintext can be made downstream to the encryptor 516. In some third embodiments, there may be a selection: the selection may choose between encrypting the DPI 510 or maintaining it in plaintext. The selection may be manual, for example. In other cases, the selection may be made by the content provider 50. In some cases, the selection is based on the standard according to which the first encrypted media stream 504 is encrypted.

In some examples, it is not necessary to re-encrypt the stream 508, but the stream 514 (including the decrypted media stream 508 with at least part of the DPI 510) may be directly transmitted through the communication interface 502 and a local connection 520 to the DP client devices. FIG. 5 shows, therefore, a line 516' bypassing the encryptor 516, which may therefore be in another embodiment. In some examples, the bypass may be the result of a selection (either manual or commanded by the remote content provider 50). For example, the encryption may be unrequired if a selection (e.g. from the content provider 50, from the user, or from a pre-selection made in factory). Therefore, it may be possible to selectively activate and deactivate the encryptor 516 (analogously at the DP client device, the decryptor will be accordingly deactivated). In these examples, a signalling in the stream may be used (e.g. a flag written in the output stream 518) for ensuring that the DP client device has the knowledge of the selection made at the DP master device 500, and activates or deactivates its own decryptor. In the examples in which the selection is not admitted, the signalling regarding the selection is skipped.

FIG. 6 shows an example of a DP client device 600 which may be used, for example, for rendering media content obtained through the local connection 520 from the DP master device 500. The DP client device 600 may include a communication interface 602. The communication interface 602 may be connected through the local connection 520 to the communication interface 502 of the DP server device 500. The communication interface 602 may be associated with an antenna element or wirings. The communication interface 602 may therefore implement protocol rules for obtaining a load from the payload (encoded and encrypted in the second encrypted media stream 518). The communication interface 602 may therefore provide (to the elements of the DP client device 600 downstream to it) the second encrypted media stream 604, which may be understood as being equivalent to the second encrypted media stream 518 as sent by the communication interface 502 through the local connection 520. The DP client device 600 may include a decryptor 606 (second decryptor), which decrypts the second encrypted media stream 604 (518) to obtain a decrypted media stream 608 (second decrypted media stream). The decrypted media stream 608 may be provided to a media renderer 610 (client device media renderer), which may be embedded into the DP client device 600 or associated thereto. The media renderer 610 may decode (decompress) the decrypted media stream 608 and control its rendering to a final user, e.g. by generating audio and/or video signals in equipment such as loudspeaker and/or displays.

The DP client device 600 may include a DP extractor 612, which may recognize the DPI 510 as added by the DPI adder 512. The DPI 510 may include timing information (e.g. a presentation time information) and may also be referred to as "handle". Once the DPI 510 is provided to the media renderer 610, the media renderer 610 may make use of the DPI 510 for controlling the playback of the media content. The DPI 510 may control the time in which, e.g. for each frame of the decrypted media stream 608, the physical audio and/or video signal, decoded from the frame, is to be generated.

As explained above, the DPI 510 may or may not be encrypted in the second encrypted media stream 518. Therefore, when the DPI 510 is encrypted, the DPI 510 will be decrypted by the decryptor 606. On the other hand, when the DPI 510 is in plain text, it is not necessary to decrypt the DPI 510. Therefore, FIG. 6 shows a transition 606' which optionally bypasses the decryptor 606 in case the DPI 510 is in plaintext, and is therefore not encrypted together with the second encrypted media stream 604 (or 518). (Alternatively, it may be simply understood that the decryptor 606 refrains from decrypting the DPI 510 when the DPI 510 is already in plaintext.)

In some examples, if the DP master device 500 has not re-encrypted the decrypted media stream 508 (and has provided, as output media stream, the decrypted media stream with the DPI 510 in plaintext) to the communication interface without making use of the encryptor 516, then the decryptor 606 may be unnecessary in some examples, since the communication interface 602 directly provides a media stream which is in plain text. This may be a matter of choice (e.g. by selection) or this may be in two different embodiments. In these cases, there may be a signalling in the output stream 604 (518) indicating that the encrypting has been selected or that the plaintext has been selected. In some other examples, there is no selection of re-encrypting at the DP master device 500, and therefore the signalling may be avoided.

In examples, the first standard may be Widevine. The second standard may be, for example, HDCP. While the DP master device 500 receives the first encrypted media stream 504 in a highly secure standard (e.g. Widevine), the DP client devices 600 may receive the second encrypted media stream 518, 604 in a second standard (e.g. HDCP) which is, in principle, less secure but more common and less expensive. Notwithstanding, security is maintained, since it is safe that the decryptor 506 is based on a high-level standard (e.g. Widevine), while the local connection 520 may be, notwithstanding, encrypted.

The media streams transmitted from the content provider 50 to the DP master device 500 and retransmitted as output media stream 518 from the DP master device 500 to the DP client devices 600 may be audio streams and/or video streams. They may be encoded, for example, using the standard MPEG-TS (other standards may be used). Each stream may include a succession of frames. A frame may include an encoded version of a media (e.g. audio and/or video) signal (e.g. in the frequency domain or in the time domain). The frames therefore include payload data. The frames may be understood as providing information of the media content to be generated in a substantially subsequent fashion: for example, each frame may provide information on the media content for a time slot of a predetermined time length, e.g. 20 ms (other time lengths are possible). In some cases, the frames are consecutive with each other (the end of one frame corresponds to the start of the subsequent frame). In some other cases, the frames may overlap. In any case, it is understood that the frames (also said "samples", and in particular in the drawings) are intended to be reproduced in a sequence.

The output media stream 518 (e.g. second encrypted media stream 518) may be an interleaved media stream. The output media stream 518 may include a beacon packet (subsequently indicated with 1320), which may be periodically transmitted by the DP media master to the DP media clients, e.g. for synchronizing the reproduction of the media content. The beacon packet may lack payload data, which may be in payload packets (1320). The DPI 510 may be transmitted in either the beacon packet (1320), or in the payload packets (1320), or in both. In examples, the beacon packet may be in plaintext, while the payload packets may be either encrypted or decrypted.

In examples, the output media stream 518 is read by all the DP client devices, but the DPI 510 may include some information (e.g., latency information) which is uniquely associated to a particular DP client device (and which will only be used by that particular DP client device).

Synchronization (Mirroring)

Techniques regarding the use of the DPI 510 and of the synchronization (e.g. mirroring techniques) are here discussed in detail.

The DPI 510 may include timing information (1312') associated to at least one frame (e.g., to plurality of frames in sequence). The DPI 510 may also include (or at least be associated to) a particular identification of the frame, e.g. a sequence number (e.g. 1312).

The timing information 1312' of the DPI 510 may include, or provide information of, a presentation time information. The presentation time information may associate the time instant of rendering in which the media content decoded from the frame is rendered.

In some examples, the time instant of rendering may be the exact time instant in which the media content is rendered e.g. at the embedded media renderer 540 of the DP master device 500, e.g., as measured by some time measurement at the embedded audio and/or video units 385, 391, 392 (see below). The time instant of rendering may therefore be in the past, and its information may be provided to the DP client devices, so that they are aware of the time instant of rendering in the past, and they synchronize accordingly.

In other examples, the time instant of rendering may be the time instant as estimated, e.g., the time instant in which it is estimated that time measurement at the embedded audio and/or video units 385, 391, 392 (see below) render the media content. This estimation may take into account, for example, the time implied for the decryption at 506, the encryption at 516, the decoding at the decoders (e.g. at 384, 385, see below). The time instant of rendering may therefore be in the past or in the future, and its information may be provided to the DP client devices, so that they are aware of the time instant of rendering, and they synchronize accordingly. Therefore, the time instant of rendering may be a scheduled time instant, which will permit the DP client devise to synchronize to the scheduled time instant.

It will be shown that the presentation time instant may also be accompanied by other information, such as latency information providing information (982) on the latency of each client device (1324-1, 1324-2, etc.). In addition or alternatively, the presentation time instant may also be accompanied by information on the playback speed 1323 at the DP master device. E.g., the DP client devices may synchronize to the DP master device by having the knowledge of how the reproduction is going at the DP master device.

The information on the latency may be obtained from feedback (980) received (or inferred) by the DP master device from (or analyzing some behavior of) the DP client devices. In some examples, each DP client device may transmit its own reproduction status (e.g., which frame is currently being played back at the time instant in which a feedback packet 1380 is transmitted by the DP client device). In other examples, the reproduction status of each client device may be inferred from a roundtrip time $t_{rt}$ elapsing between the transmission of a particular packet by the DP master device (e.g., a beacon packet 1320, or a particular data payload packet 1310) and the reception of a feedback packet (response packet or acknowledgement packet) 1320 from the DP client device. From the roundtrip time, it is possible to infer the latency of the particular DP client device.

When the DP master device knows the latency of each DP client device, it may therefore decide the new timing information for the future frames to be represented. For example, the DP master device may schedule the future frames following the DP client with maximum latency (and/or may exclude DP master devices with excessively high delay).

In some cases, some assumptions may be made. For example, at least one among the time needed for encrypting/decrypting, encoding/decoding, processing the media signals at the actuators, transmission in the local connection 520, etc., may be estimated. For example, when the latency is estimated from the roundtrip time, the DP master device may assume that the real time instant of the rendering at the renderer 610 of the DP client device will occur after a predetermined, known (e.g. fixed) time delay.

The same may apply to the presentation time stamp indicating the time instant in which the frame has been played back in the past: if it is known that the embedded renderer 540 and/or the renderers 610 of the DP client devices need a fixed amount of time for decoding and presenting the media content, then this fixed amount of time may be easily be taken into account. This assumption may also be valid for the time needed for performing the decryption/encryption, for example.

It is also possible that the DP client devices make use of a beacon packet 1320 sent by the DP master device for resynchronizing their internal clock.

In the examples above and below it is in general assumed that the DP master device includes a renderer 540. However, this is not necessary: the DP master device may simply be a scheduler, and control the playback at the DP client devices.

The frames of the media streams (also indicated as "samples" or "audio/video samples" or "a/v samples") are meant at being rendered (played back) at some particular time instant. However, the DPI adder 512 may provide in the DPI 510 (e.g. as included in the stream 514) some timing information, which defines the time instant at which the physical signal (e.g. sound, images, etc.) is (or is scheduled to be) generated. The DPI 510 (which is also referred to as "handle" in some examples) may take into account the time needed for encrypting the decrypted media stream 508 (514) by the encryptor 516, the time for providing the second encrypted media stream 518 to the communication interface 502, the time for transmitting the second encrypted media stream 518 to the DP client devices 600, the time needed for the DP client devices 600 to decrypt the second encrypted media stream 518, and the time needed for the DP client devices 600 for decoding the second media stream 518, when decrypted. Accordingly, all the DP client devices 600 will provide the media content simultaneously.

As explained above, the DP master device 500 may also have the embedded media renderer 540 for also providing media content to a user in parallel to the media renders 610 of the DP client devices 600. E.g. the DP master device 500 may comprise a decoder and may comprise audio and/or video units such as loudspeaker(s), display(s), etc., or comprise connection(s) for transmitting audio and/or video signals to the audio and/or video units.

The embedded media renderer 540 may be understood as being connected directly (e.g., through electric, optic, magnetic connections) to the upstream elements of the DP master device (e.g. 502, 506, etc.) and the decrypted media stream 508 and the DPI 510 may be provided to the embedded media renderer 540 directly, without passing through the local connection 520.

However, in principle the playback of the media content at the embedded media renderer 540 risks to result non-synchronized with the playback of the same media content of the DP client devices 600. The playback at the media renderer 540 of the DP master device 500 could in principle unwantedly anticipate the playback of the same media content at the DP client devices 600: indeed, the embedded media renderer 540 does not need to wait for the time needed to re-encrypt the decrypted media stream 508 at encryptor 516, to transmit the second encrypted media stream 518 through the local connection 520, and to re-decrypt, at the client's decryptor 506, the second encrypted stream 518. Hence, a lack of synchronization risks to be caused. However, it has been understood that it is possible to simply synchronize the embedded media renderer 540 with the DP client devices 600 by controlling the timing of the embedded media renderer 540 and the timing of the DP client devices 600 to be synchronized to each other.

A timing control for achieving the pursued synchronization may make use, for example, of the DPI 510. The DPI 510 may include timing information 1312' associated to at least one frame (e.g., a plurality of subsequent frames) providing presentation time information which informs the media renderers (e.g. both the embedded renderer 540 and the DP client renderer 610) on which is the time instant at which the at least one frame, associated to the DPI 510, is (or is to be) rendered (e.g., the time instant could be the time instant at which the rendering of the at least one frame shall start). (In other examples, the DPI 510 may include timing information associated to a frame which has already been rendered, or at least has been scheduled, by the DP master device). The timing information (and more in particular the presentation time information or the timing information associated to a frame which has already been rendered or scheduled) may therefore control the generation of the media content at the media renderers, so that the media content is provided synchronously at the same time instants. Advantageously, as shown in FIG. 5, the DPI 510 (and in particular the timing information, and more in particular the presentation time information) may also be provided to the embedded media renderer 540 of the DP master device 500, so as to also control the presentation time of the frames analogously to the control exerted in respect to the DP client devices 600. The timing information in the DPI 510 may therefore be provided to the embedded media renderer 540, to control the timing of the embedded media renderer 540 (e.g. by delaying the reproduction of the media content at the embedded media renderer 540 by a delay time controlled by the DPI 510 which keeps into account the delays to which the reproduction of the media content at the DP client devices 600 is subjected). The DPI 510 may keep into account the (known or inferred) reproduction status of the media content at the embedded media renderer 540, so that latencies (like those due to the re-encryption at encryptor 516, the transmission through the local connection 520, and/or the decryption at the DP client devices 600) are taken into account. The timing information in the DPI 510 may therefore provide a presentation time information, which includes information on the time instant (e.g. absolute time instant) in which the at least one frame is to be rendered. Therefore, this presentation time information in the DPI 510 may give information on the time instant in which the physical signal encoded in the at least one frame of the stream is to be generated for each of the devices (DP master device and DP client devices). By making use of the time information provided by the DPI 510, the media content may result to be presented synchronously by the multiplicity of renderers (540, 610, etc.), so as to permit a plurality of users to enjoy synchronized media content.

Figure 7A:
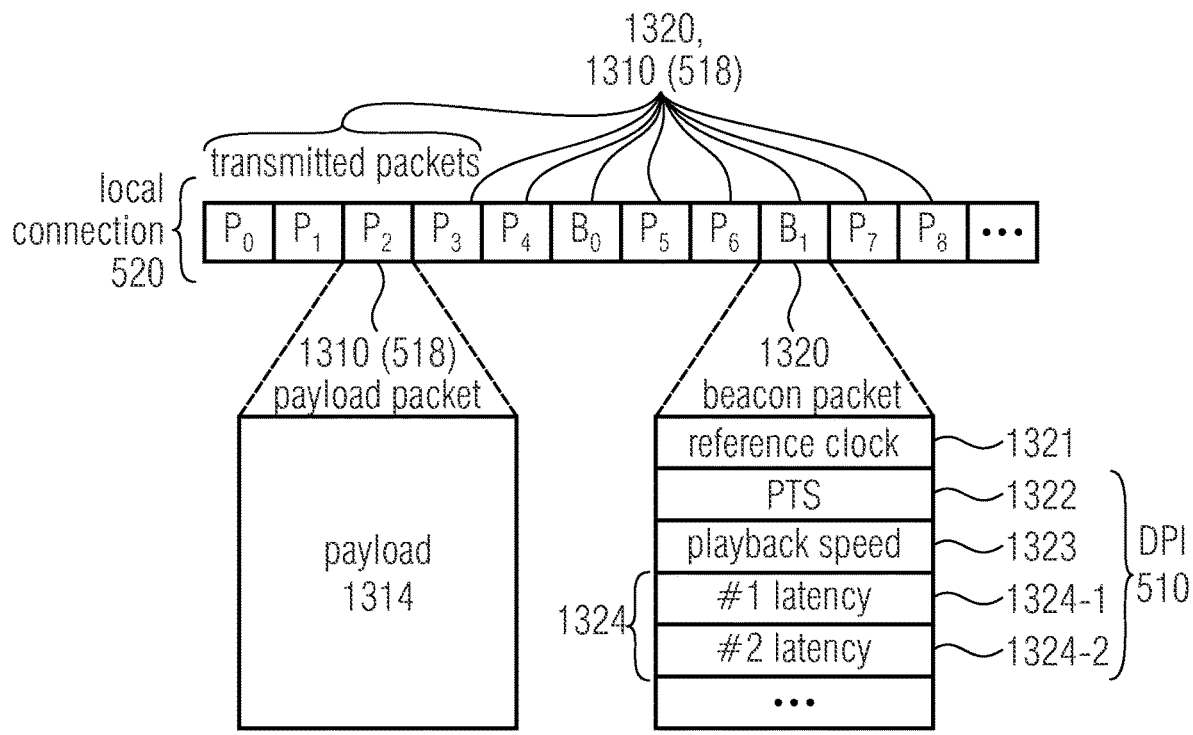
FIGS. 7a,7b show communications according to examples.
Figure 7B:
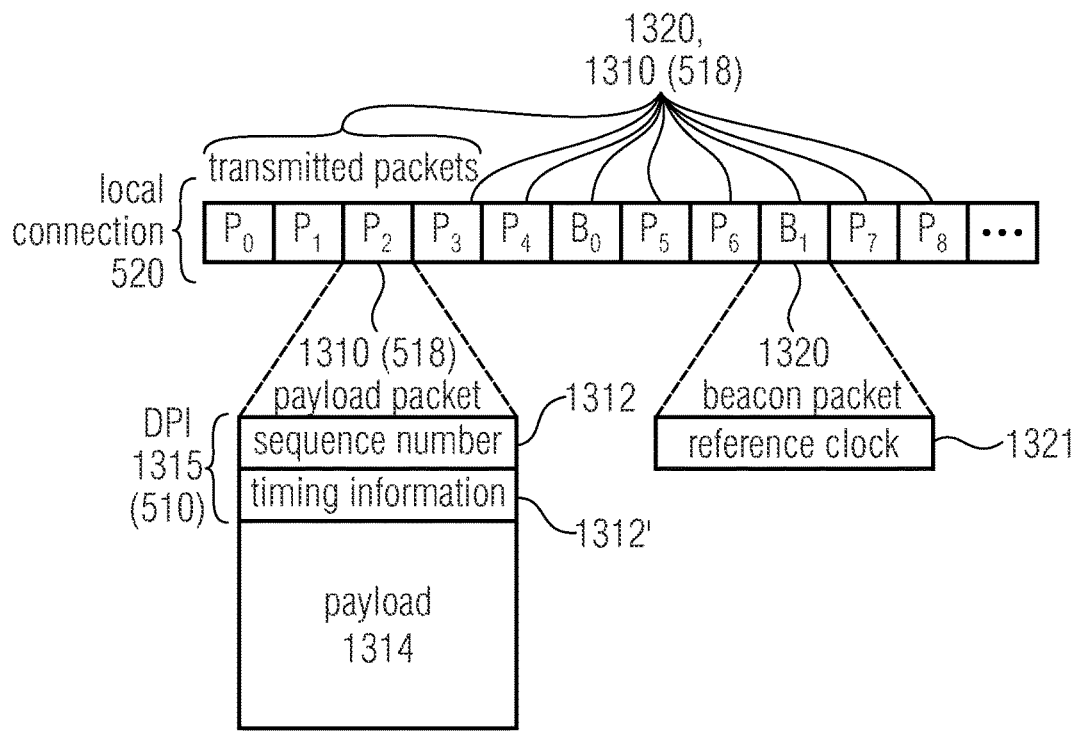
Figure 8:
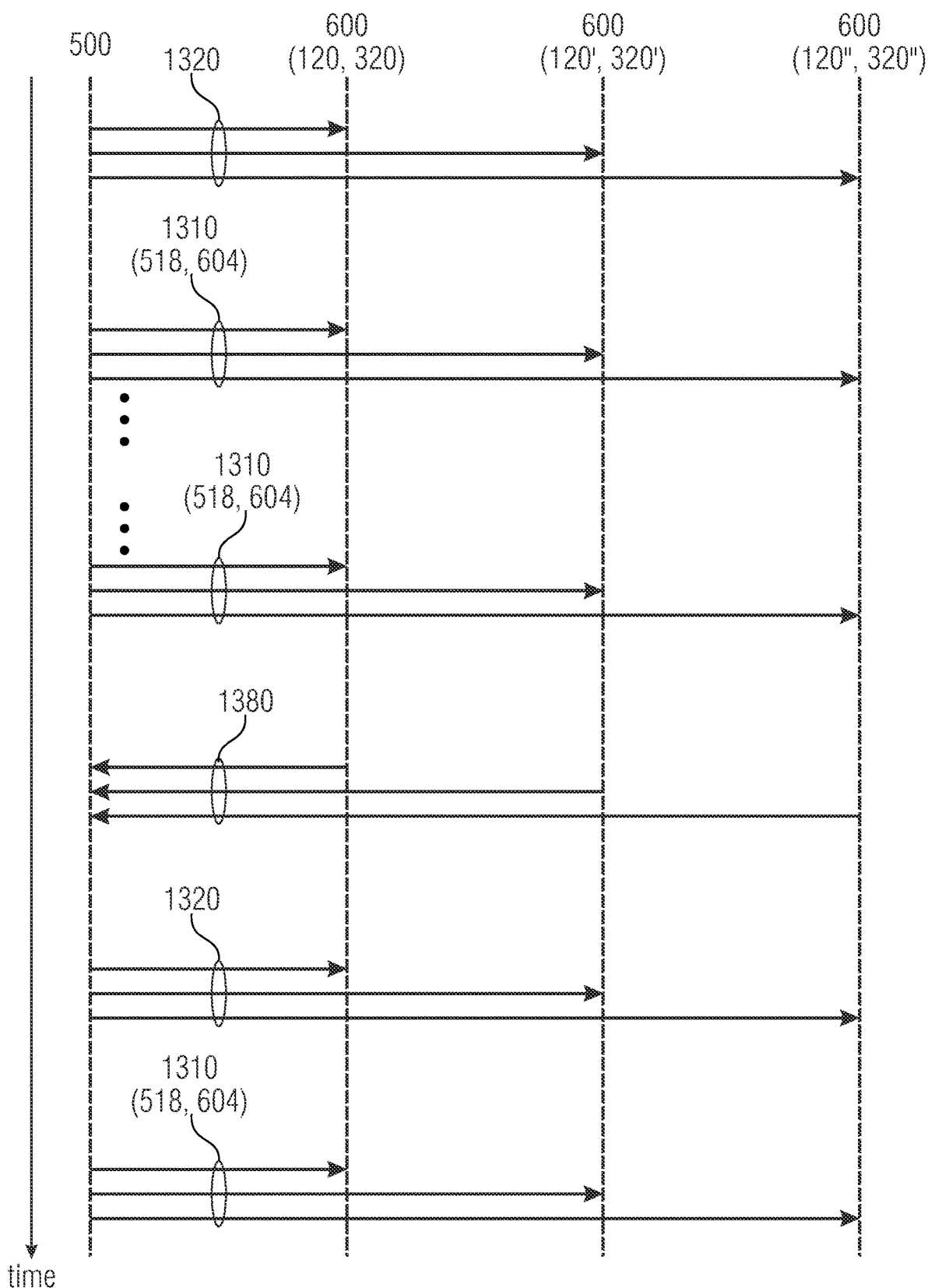
FIG. 8 shows a communication protocol according to an example.
Figure 9A:
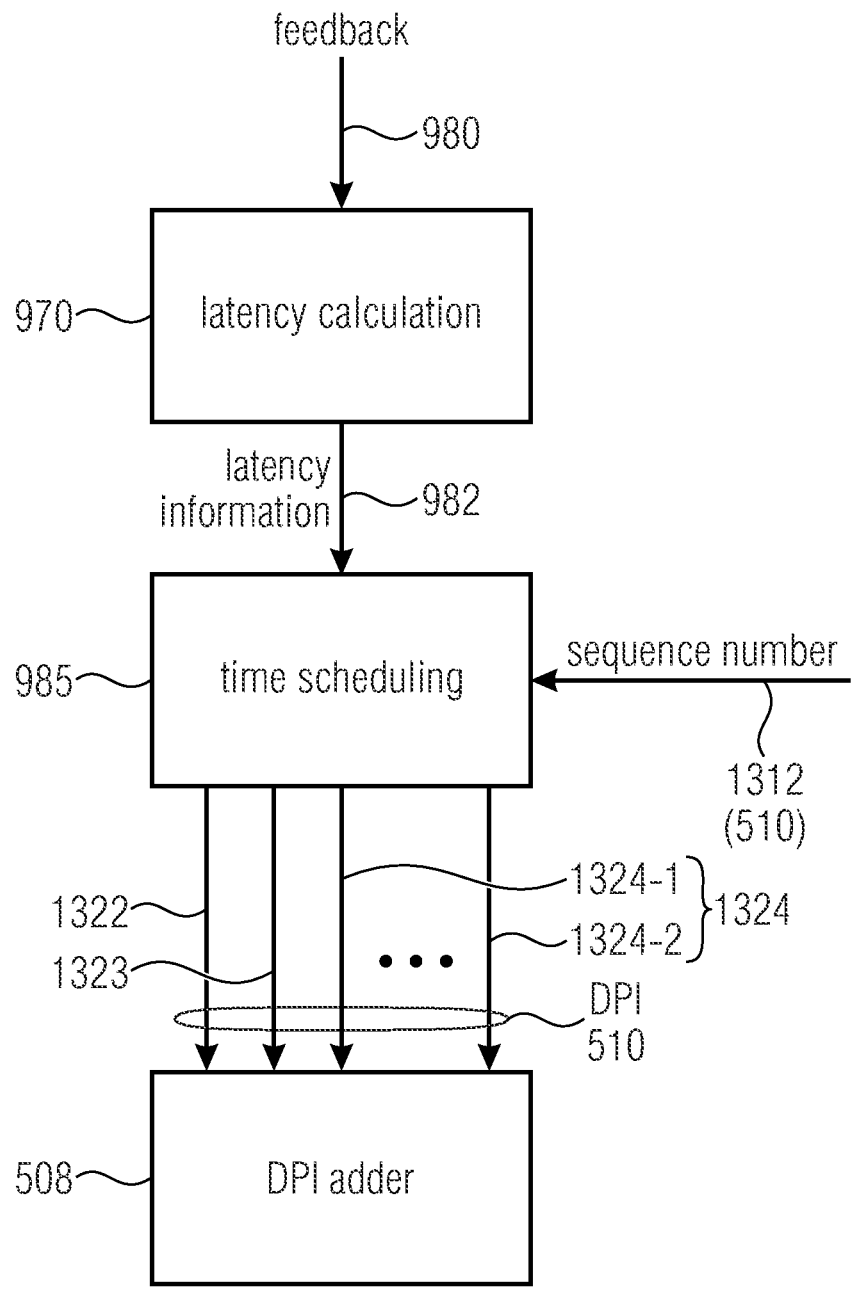
FIGS. 9a, 9b show techniques according to examples.
Figure 9B:
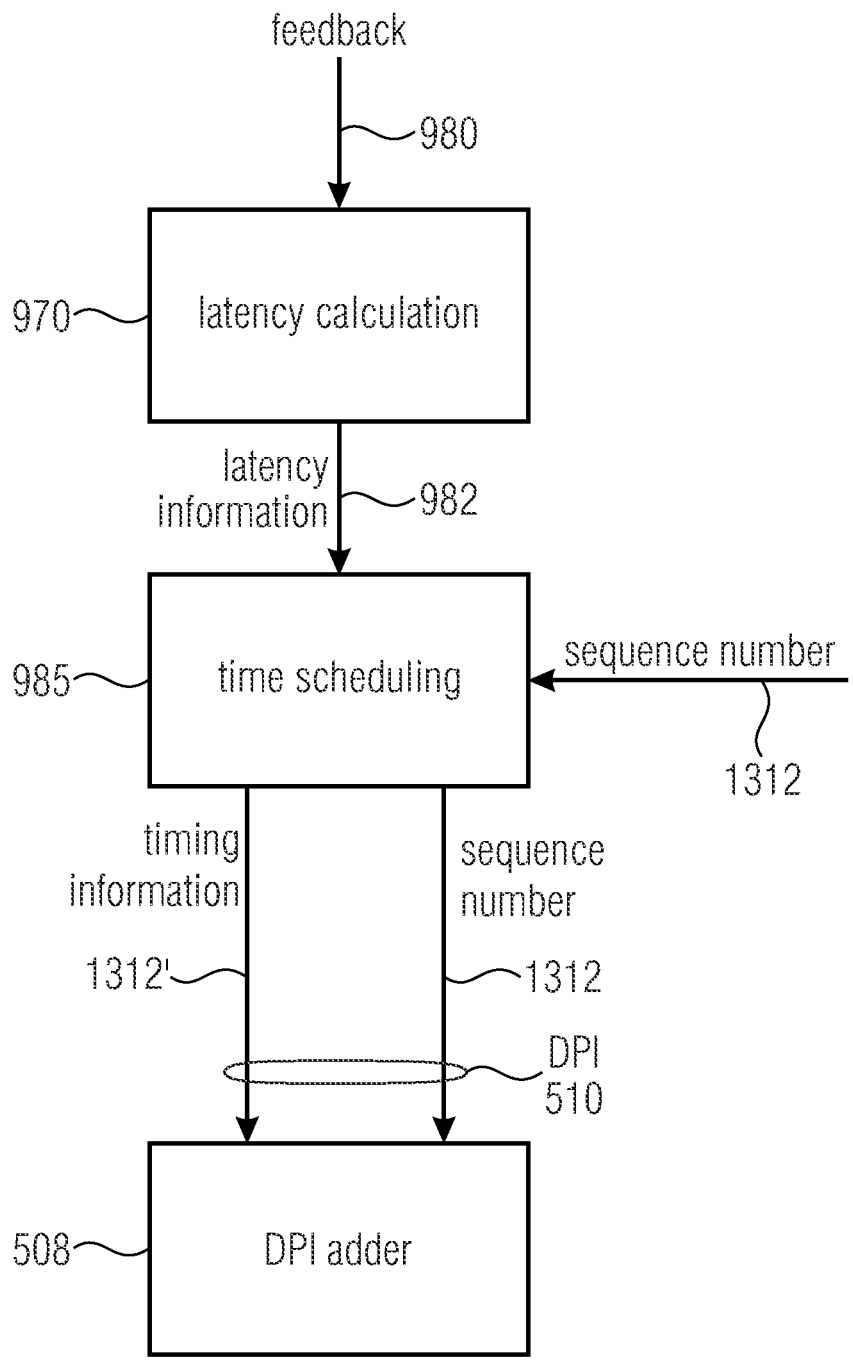

Reference is now made to an example shown in FIGS. 7b, 8, and 9b.

FIG. 7b shows an example of communication between the DP master device 500 and the plurality of DP client devices 600. The communication may be wireless (but in some examples could be wired). As shown in FIG. 7b, the communication at the local connection 520 appears like a sequence of packets which are transmitted either from the DP master device 500 towards the DP client devices 600 or vice versa. The DP master device 500 may transmit payload packets 1310 which instantiate the frames ("encrypted samples") of the second encrypted data stream 518 (604), or more in general of the output media stream. Therefore, each payload packet 1310 may be understood as an a/v sample, encrypted according to the second encryption standard, and transmitted from the DP master device 500 to the DP client devices 600. Each payload packet 1310 (518, 604) is here indicated with $P_0$, $P_1$, $P_2$, $P_3$, $P_4$, $P_5$, $P_6$, $P_7$, and $P_8$. The syntax of each packet is, in general, predefined according to the specific communication protocol, so that the DP master device 500 and the DP client devices 600 share protocol rules that permit the DP client devices 600 to receive and process the payload packets 1310 (518, 604). According to protocols, each payload packet 1310 (518, 604) may be identified by a sequence number 1312 which indicates the position of the packet (frame) in the sequence of the payload packet (the sequence number 1312 may be understood as being part of the DPI 510, in some examples). As explained above, each payload packet may be associated to a physical audio and/or video media signal, which is in general to be generated in sequence. For example, the payload packet $P_2$ is to be rendered, in general, before the rendering of the payload packet $P_3$. Each payload packet 1310 (518, 604) may include a payload field 1314, which has, encoded therein, payload data associated to the media signal that is to be generated. The payload data may be, for example, in a spectral domain (e.g. frequency domain). At least one (e.g. each) payload packet 1310 (518, 604) may include the DPI 510 encoded in a field 1315.

The DPI 510 (1315) may be or include timing information providing presentation time information on the time instant in which the at least one frame is to be rendered. Therefore, the DPI 510 (1315) may provide information on the instant in which the media content, encoded in that payload packet 1310, is to be presented to the user (a physical sound and/or image is to be generated). The DPI 510 (1315) may indicate, for example, a time offset from a common time reference shared between the DP master device 500 and the DP client devices 600, or in other cases an absolute time (other solutions are possible).

As explained above, at least the payload packet 1310 (and maybe also the sequence number 1312) may be encrypted (e.g. by the encryptor 510) according to the second encrypted standard (in the cases in which it is so-provided). The DPI 510 in field 1315 may be encrypted or non-encrypted in accordance to the possible options and/or examples as discussed above.

It is in general not granted that the packets 1310 of the transmitted encrypted media stream 518 (604) are actually received in the same order according to the intended sequence. In some cases, for example, the transmission of some payload packets needs to be repeated, for example when a received packet does not pass a check at the DP client device (e.g. in case of a negative redundancy check CRC), e.g. because of a collision with other payload packets transmitted by a DP client device, and needs to be retransmitted. The latency of the packet reception is more in general not deterministic, e.g. due to the status of the connection: if the connection is busy it may be impossible to grant that a packet 1310 arrives at the DP client device 600 at a particular instant. Therefore, there may happen that a packet $P_i$ is correctly received by the DP client device after a subsequent packet $P_{i+n}$, and also the reception of the packet at a specific point in time is not in principle safe.

The sequence number 1312 permits the DP client devices 600 to reposition the payload packets 1310 in their intended order, hence at least partially coping with the problem. Notwithstanding, the sequence number 1312, as such, does not necessarily give information on the presentation time at which the specific payload 1314 of the specific payload packet 1310 is to be played back.

However, it has been understood that, by introducing, in the DPI 510 (1315), timing information 1312' which provides presentation time information on the time instant in which the specific payload packet 1310 is to be presented, then it is possible to reach the result that all the DP client devices 600 provide the audio and video signals simultaneously. The timing information 1312' in the DPI 510 (1315) may for example provide an offset from a common reference clock (common time reference), so that all the devices (DP master device 500 and client devices 600) transmit the media content synchronously.

The provision of presentation time information 1312' in the DPI 510 (1315) may make use of a common time reference which is in principle shared by the DP master device 500 and the DP client devices 600. In some cases, there may be the provision of a beacon packet (indicated in FIG. 7b with 1320 or Bo or Bi), which can permit to provide a common time reference information, so that the DP master device 500 and the DP client device 600 have the same time knowledge. The DP master device 500 (or, in some cases, another time master device, not shown in the figure) may transmit a beacon packet 1320 that provides a master time reference information to the all DP client devices 500, the master time reference information being used, in essence, as the common time reference information. The common time reference information may be provided, for example, in a reference clock field 1321. The reference clock field 1321 may be, for example, the timestamp, at which the beacon packet 1320 has been transmitted (using the time knowledge of the DP master device 500 or of the other time master device). In general terms, the clock of the DP client device 600 may resynchronize at any time it receives the beacon packet 1320 and may be supposed to playback the payload 1314 at a delay, which is based on the reference clock field 1321, indicated in the DPI 510 (1315). Other strategies are notwithstanding possible.

The DP master device 500 may in examples receive feedback from the DP client devices 600. The DP master device 500 may therefore determine the latency of each DP client device 600 from the roundtrip time. From the determined latency, the DP master device 500 may decide the presentation time at which the payload media content is to be rendered by the DP client devices 600.

It may be important for the DP master device 500 to know the latency of the DP client devices 600, so as to coordinate the synchronization of the generation of the physical audio and video signals, e.g. at the media renderer 540 of the DP master device 500. For example, the DP master device 500 may make use of the DPI 510 of its own, even upstream of the DPI being encoded in the field 1315. By determining the latency of the rendering at each client device 600, the playback of the media content at a least the embedded renderer 540 may be controlled. Hence, the embedded renderer 540 may delay the reproduction of the media content at least at the DP master device 600, to achieve a coordinated generation of audio and video physical signals with the media renderers 510 of the DP client devices 600.

The DP master device 500 may therefore define the DPI 510 (1315), either by taking into account the feedback from the DP client devices 600 (e.g. by means of feedback packets indicating the presentation timestamp at each of the clients) or in open chain, on the basis of predefined assumptions, or both.

In some examples, an open-chain strategy may be followed. For example, the time needed for the encryption at block 516, the transmission in the local connection 520, and the decryption at block 606, and the processing for the media rendering at block 610 may be pre-estimated (in some cases, the time needed for the encryption at encryptor 516 may notwithstanding be obtained in real time, without estimation, since it may be already at disposal of the DP master device 500). Therefore, in open-chain examples, the feedback regarding the reproduction status at the DP client devices 600 may be avoided to increase simplicity.

FIG. 8 shows an example of communication between the DP master device 500 and a plurality of DP client devices 600 (also indicated with 120, 120', 120", 320, 320', 320") at the local connection 520. At first, the DP master device 500 may transmit a beacon packet (or other information on common timer reference) 1320. The beacon packet 1320 may be part of the output media stream (e.g. encrypted or non-encrypted media stream) 518 sent by the DP master device 500 to the DP client devices 600. When a DP client device 600 receives the beacon packet 1320, it synchronizes its own internal clock to the reference clock field 1321. Hence all the DP client devices are synchronized with the DP master device 500 or the same may be inferred. Subsequently, the DP master device 500 may transmit the second encrypted stream 518 (604) including the DPI 510 in form of payload packets 1310. The DPI 510 of each packet (or plurality of consecutive packets) includes the presentation time information which provides the exact time instant in which the media content encoded in the payload 1314 of each payload packet 1310 is to be rendered. Notably, all the DP client devices now share the same time knowledge by virtue of the beacon packet. Hence, the content encoded in the second encrypted data stream 518 (encoded in the payload field 1314) will be provided to the users synchronously. Also the media content provided by the embedded renderer 540 internal to the DP master device 500 is rendered synchronously to the media content rendered by the media renderers 610 of the DP client devices, by virtue of the fact that the embedded renderer 540 also makes use of the DPI 510, and therefore makes use of the same presentation time information of the DP client devices. Subsequently (e.g. after a predetermined time is elapsed), each of the DP client devices 600 may transmit a feedback packet 1380. The feedback packet 1380 as sent by each of the DP client devices may include the local time reference as experienced by each DP client device at the time in which the feedback message 1380 is sent to the DP master device 500. This information will permit the DP master device 500 to know the time knowledge of each DP client device. The feedback packet 1380 as sent by each of DP client devices may include information on the reproduction status (e.g., the frame which is currently being rendered). The information on the time knowledge of each DP client device and/or the information on the reproduction status at each DP client device may permit the DP master device to understand the real status of the reproduction at each DP client device. From this feedback information, the DP master device 500 may predict the time instant at which the next frames of the media stream will have to be rendered. If from the feedback information the DP master device 500 determines that the latency of the reproduction at the client renderers 610 is large, the DP master device 500 will subsequently increase the delay of the presentation time information of the subsequent frames (or at least maintain a large delay), so as to permit a synchronous reproduction of the media content. Notably, the resulting delay at the embedded renderer 540 will be accordingly increased (or at least maintained large), so that the embedded renderer 540 results synchronous with the delay of the media renderers 610 of DP client devices 600. If from the feedback information the DP master device 500 determines that the latency of the reproduction at the client renderers 610 is low, the DP master device 500 may subsequently decrease (or maintain low) the delay of the presentation time information of the subsequent frames, since the synchronous reproduction of the media content is not endangered. In particular, the resulting delay at the embedded renderer 540 will in general be reduced (or at least maintained low), and the embedded renderer 540 results synchronous to the media renderers 610 of DP client devices 600. The feedback information obtained (or inferred) from each DP client device 600 e.g. permits the DP master device 500 to calculate the latency experienced at each DP client device, hence tolerating clock errors at DP client device.

Subsequently, the DP master device 1320 may transmit a new beacon packet 1320 and new payload packets 1310.

FIG. 9b shows an example of how the DPI 510 may be determined at the DP master device 500. Feedback 980 may be obtained from each DP client device, e.g. as obtained from the feedback message (packet) 1380. The DP master device 500 may therefore at a latency calculation block 970, obtain the latency 982 of each DP client device.

The feedback 980 may include, in one example, information on reproduction status, e.g., information on the time instant at which a particular frame (identified by its sequence number 1312) has been rendered by the DP client device. This information in the feedback 980 may for example be encoded in the feedback message 1380.

In addition or alternatively, the reproduction status (and the information at which a particular frame has been rendered by the DP client device) at each DP client device may be estimated based on the time at which the feedback message 1380 has been received, if it is provided that the feedback message is to be sent by the DP client device soon after, or after a predefined time elapsed from, the reception of the beacon packet 1320 (the feedback message 1380 may be called acknowledgment message in this case). The c may therefore calculate a roundtrip time $t_{rt}$. E.g., the time $t_{1380}$ of reception of the feedback message 1380 may be subtracted to the reference time $t_{1320}$ as written in the reference clock field 1321 of the related beacon packet 1320. Therefore, the roundtrip time may be calculated as $$t_{rt}=t_{1380}-t_{1320}.$$

It is possible for the latency calculation block 970 to estimate the time needed for the DP client device to receive the beacon packet 1320 by dividing the roundtrip time by two (e.g. $t_{reception}=t_{rt}/2$). An additional decrypting-and-rendering time $t_{d\&r}$ may be added to the estimated reception time instant $t_{reception}$, to obtain that the estimated presentation time $t_{presentation}$ in which the media signal has been presented, i.e.

$$t_{presentation}=t_{reception}+t_{d\&r}.$$

The decrypting-and-rendering time $t_{d\&r}$ may be predefined and/or fixed, and may in some examples vary according to the different DP client devices and/or different decryption techniques. The latency (provided as latency information 982) may be obtained by calculating the difference between the estimated presentation time for each DP client device and the presentation time of the DP master device.

In other examples, the use of the decrypting-and-rendering time $t_{d\&r}$ may be avoided, and a latency information 982 may be understood as the elapsed time needed for the DP client device to receive the beacon packet 1320.

The obtained latency information 982 may be provided to a time scheduling block 985, which may schedule the transmission of each frame identified by the sequence number 1312 of the DPI 510.

The time scheduling block 985 may, for example, calculate the maximum latency among the latencies calculated by the latency calculation block 970, so as to define the presentation time information in the timing information 1312' of the DPI 510 accordingly. In some examples, to define the presentation time information may be associated to the maximum latency among the DP client devices, so as to avoid that one device is out of synchronism with the other ones. On the other side, the maximum latency may be compared to a threshold, so as to avoid that one single DP client device delays the whole system (in that case, the excessively-latency device may be excluded or a resynchronizing procedure may be activated). However, the presentation time information to be written in the DPI 510 is defined to take into account the latencies of the DP client devices, and this will control the rendering of the media content at both the DP client devices and the DP master device.

The DPI 510 as output by the time scheduling block 985 may therefore comprise both the sequence number 1312 of the frame and timing information 1312' (e.g. presentation time information) at which the frame (to be encoded in a payload packet 1310) associated to the sequence number 1312 is to be played back.

In view of the above, the timing information (and in particular, the presentation timing information) may be understood as indicating the presentation time at which the particular frame will have to be rendered. Notwithstanding, it is also possible to synchronize the DP client device to the DP master device in another way, which is prevalently shown in FIGS. 7a, 8, and 9a, where the payload (which may be encrypted) 1314 is shown, together with the local connection 520 and the payload packets (payload packets) 1310 of the output data stream 518. Here, beacon packet 1320 comprises a reference clock 1321, which may be as above, and a further presentation time stamp (PTS) 1322, information on payback speed 1323, and latencies of the DP client devices collectively indicated with 1324.

In some examples, there may be a presentation time information which may be a presentation timestamp (PTS) 1322, which may be the current presentation time on the media renderer 610 of the DP master device 500 (e.g., as scheduled). The PTS 1322 may therefore provide the presentation time on the master device 500 at the time at which the beacon packet 1320 is transmitted. The PTS 1322 is, in principle, different from the reference time of field 1321, since the PTS 1322 is modified by the current playback speed, while the reference time of field 1321 simply measures the time. In some cases, the playback speed 1323 can be indicated in the beacon packet 1320. In some cases, the latency of each of the DP client devices 600 (as measured by the DP master device 500) may be indicated in fields such as 1324-1 and 1324-2, etc. From the data fields indicated in the beacon packet 1320, it is possible for each client device 600 to resynchronize its own clock to the clock of the DP master device 500 and have the notion of the playback status at the DP master device 500. It is noted, notwithstanding, that the beacon packet 1320 may simply be a packet providing time information, which does not comprise a payload. The payload may be in general transmitted in field 1314 of the payload packet 1310 and the indication in which the payload 1314 is to be transmitted may be provided in the DPI field 1315 (510) of the same payload packet 1310.

Therefore, the DPI 510 can be considered as including at least one of the PTS 1322, the playback speed 1323, and the latency information 1324, associated to each DP client device. The DP client device, when receiving the reference clock 1321, the PTS 1322, the playback speed 1323, and its own latency, may adjust its own presentation time, which may be the PTS indicated in the field 1322 plus the latency indicated in the related field 1324 multiplied by the playback speed. Hence, the DPI client device has a presentation timing, which is synchronized to the presentation timing at the DP master device, plus the latency multiplied by the playback speed. Hence, the DP client device's presentation timing results synchronized to the presentation timing of the DP master device. Notably, this latency may be calculated, as above, from the roundtrip time as explained above. Hence, the DP client devices render the media content synchronously with the embedded media renderer of the DP master device.

Hence, the PTS 1322 may be understood, in some examples, as being a time instant occurred in the past. The presentation time at which the media content for a particular frame will have to be presented will be determined by the DP client device on the basis of the playback speed and its own latency. Hence, when the frame has already been rendered in the past, this technique does not really synchronize that past frame, but synchronizes the subsequent frames. Further, the timing information of the DPI 510 may be considered to also include the information on the latency 1324 associated to the particular DPI client device and/or the current playback speed advised by the master device.

A control (ideally embodied by the control signal 388') may be, at the DP master device, so that:

in case the latency 982 of the rendering at at least a predetermined number N of client devices is increased, then the delay of the rendering at the embedded media renderer 540 (and maybe also at the DP client renderers 610) may be increased, and/or in case the latency 982 of the rendering at at least a predetermined number N of client devices is reduced, then the delay of the rendering at the embedded media renderer 540 (and maybe also at the DP client renderers 610) may be reduced.

The predetermined number N may be 1, or 2, or another number (e.g., pre-selected). In some cases, it may be defined that it is not possible to wait for one single device: e.g., if a latency of one DP client device overcomes a predetermined threshold, the control will not take into consideration the excessively delayed DP client device any more.

The DP master device and the DP client devices may also exchange commands, e.g., reproduction (playback) commands (e.g. at least one of PAUSE and RESUME, etc.). The command may be input by a user (e.g. at the DP master device or at one of the DP client devices), and the command may be relayed (e.g. through the local connection 520) to the plurality of DP client devices. If the command is input by the user at a DP client device, then the DP client device may transmit information on the command in through the local connection 520, so that the DP master device relays the command to the plurality of DP client devices. The information of the command from the DP client device to the DP master device may be included in one field in a feedback packet 1380. The information on the command from the DP master device to the DP client devices may be provided, for example, in the beacon packet 1320 and/or in a payload packet 1310. In some cases, the DP master device (e.g., in particular, the DP adder 508) may also add, in the stream 518, timing information (e.g., presentation timing information) informing in which time instant the command is to be executed by the plurality of DP client devices (and embedded media renderer 540 may also follow the same presentation timing information of the command). Accordingly, when the reproduction is paused, all the devices will show, for example, the same image in the screen.

EXAMPLES

Several embodiments will be shown subsequently in FIGS. 1*a*-4. The embodiments may be, in some cases, different instantiations of the same devices and do not necessarily need to be different devices. The different operations therefore may be due to particular selections.

In some examples, at the DP master device, at the DP client devices and/or at both, the hardware may be subdivided between a trusted environment (also indicated as a "trusted execution environment", TEE) and a non-trusted environment (also indicated as "rich execution environment"). In some cases, the trusted environment is considered to have a level of security which is greater than the level of security of the non-trusted environment. For example, in case of the trusted environment being part of the DP master device 500, the decryptor 506 and/or the encryptor 516 may be part of the trusted environment. Accordingly, the decryption and encryption of the media stream are only performed at the trusted environment, hence minimizing the possibility of spoofing media content illegally. Additionally or alternatively, at DP client devices 600, at least the decryptor media stream 606 may be internal to the trusted environment.

The media streams (encrypted or decrypted) discussed above and below may be audio streams, video streams, or both audio and video streams. It is not necessary that both, the audio stream and the media stream, are subjected to the same processing. For example, only some media streams (e.g. the audio streams) may be decrypted and re-encrypted at elements 506 and 516 of the DP master device 500, and, analogously, redecrypted by the decryptor 606. In some cases, for example, the audio stream could be in plain text at the remote connection 501 and/or at the local connection 520, while the encrypting/decrypting shown in FIG. 5 could only interest the video stream. The same could occur at DP client device 600. Notwithstanding, in some examples the provisioning of the DPI 510 may interest both, the audio stream and the video stream, so as to coordinate (e.g. through synchronization) the presentation timing of both the audio content and the video content.

Where the DP master device 500 or the DP client device 600 is divided between a trusted environment and a non-trusted environment, it may be that the audio rendering (audio decoding and audio playing back) is performed at the non-trusted environment, while the encrypting and/or decrypting of the audio streams can actually be processed at the trusted environment. In addition or alternatively, the video rendering (video rendering and/or audio rendering) may be performed at the trusted environment, e.g. together with the encrypting and/or decrypting of the video stream, while the vide stream may only exist, out of the trusted environment, only in encrypted form.

Figures 1, 1A:
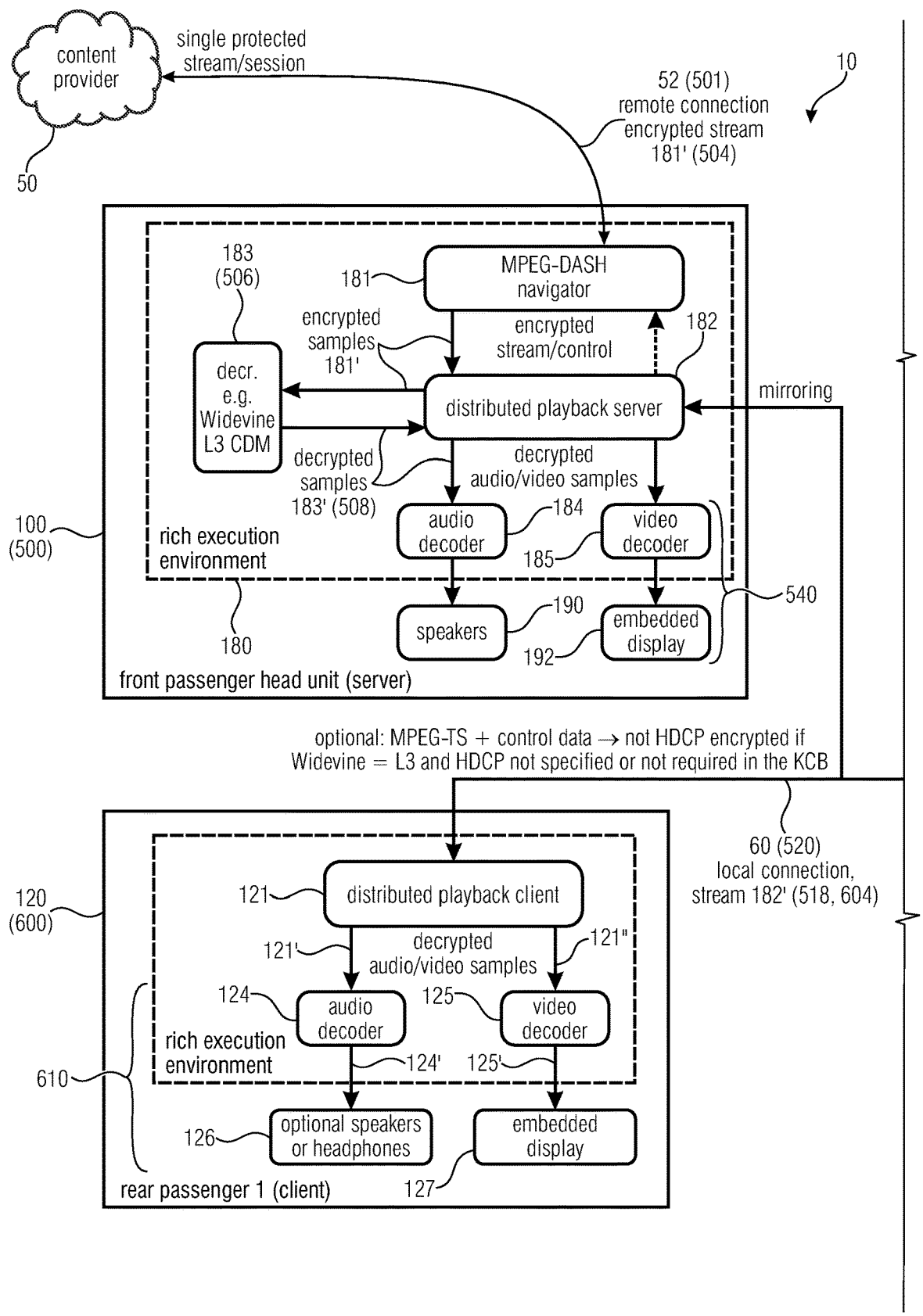
FIG. 1a shows an example of a local system according to an example.
Figures 1, 1A, 2:
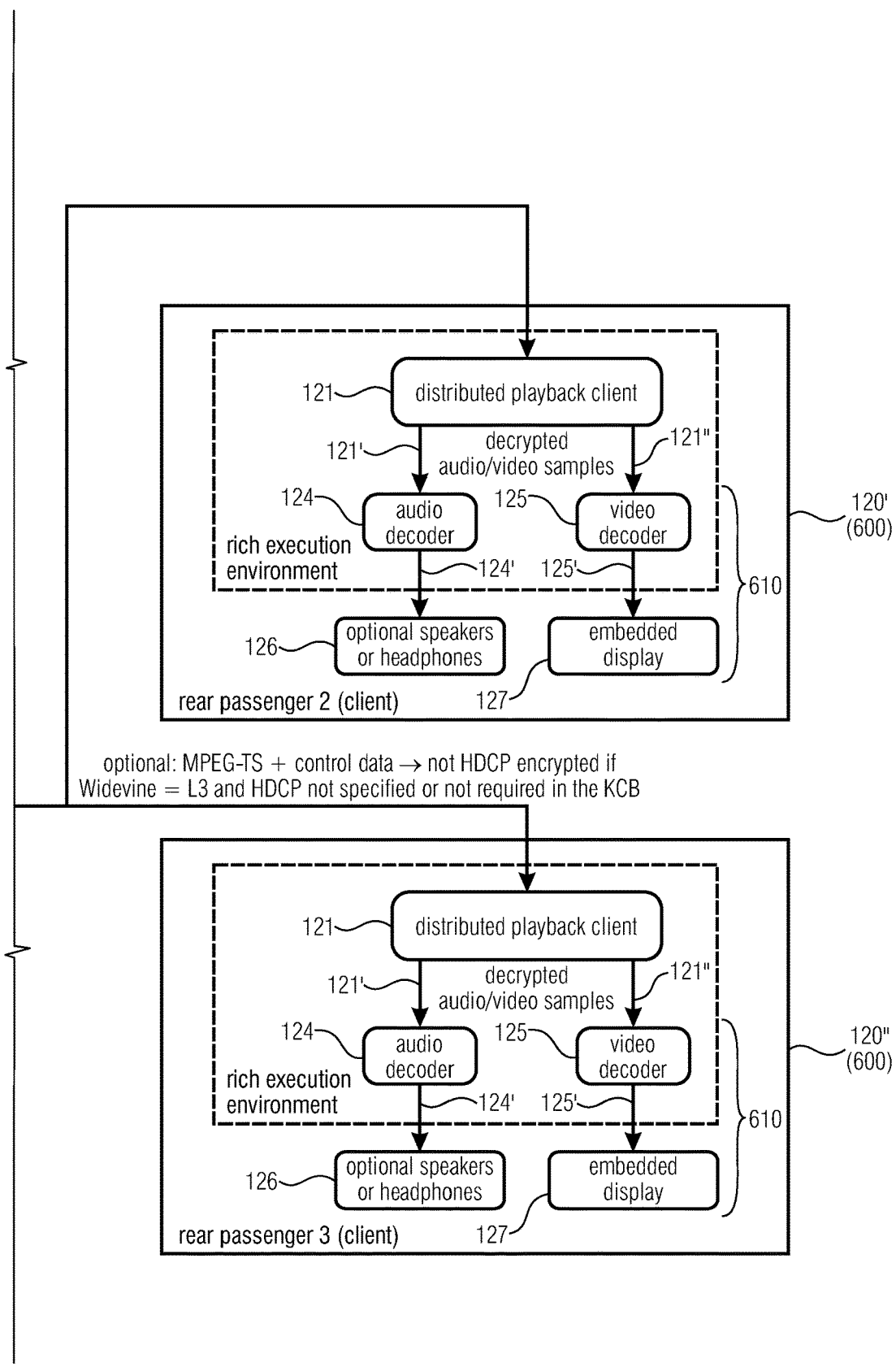
Figure 1B:
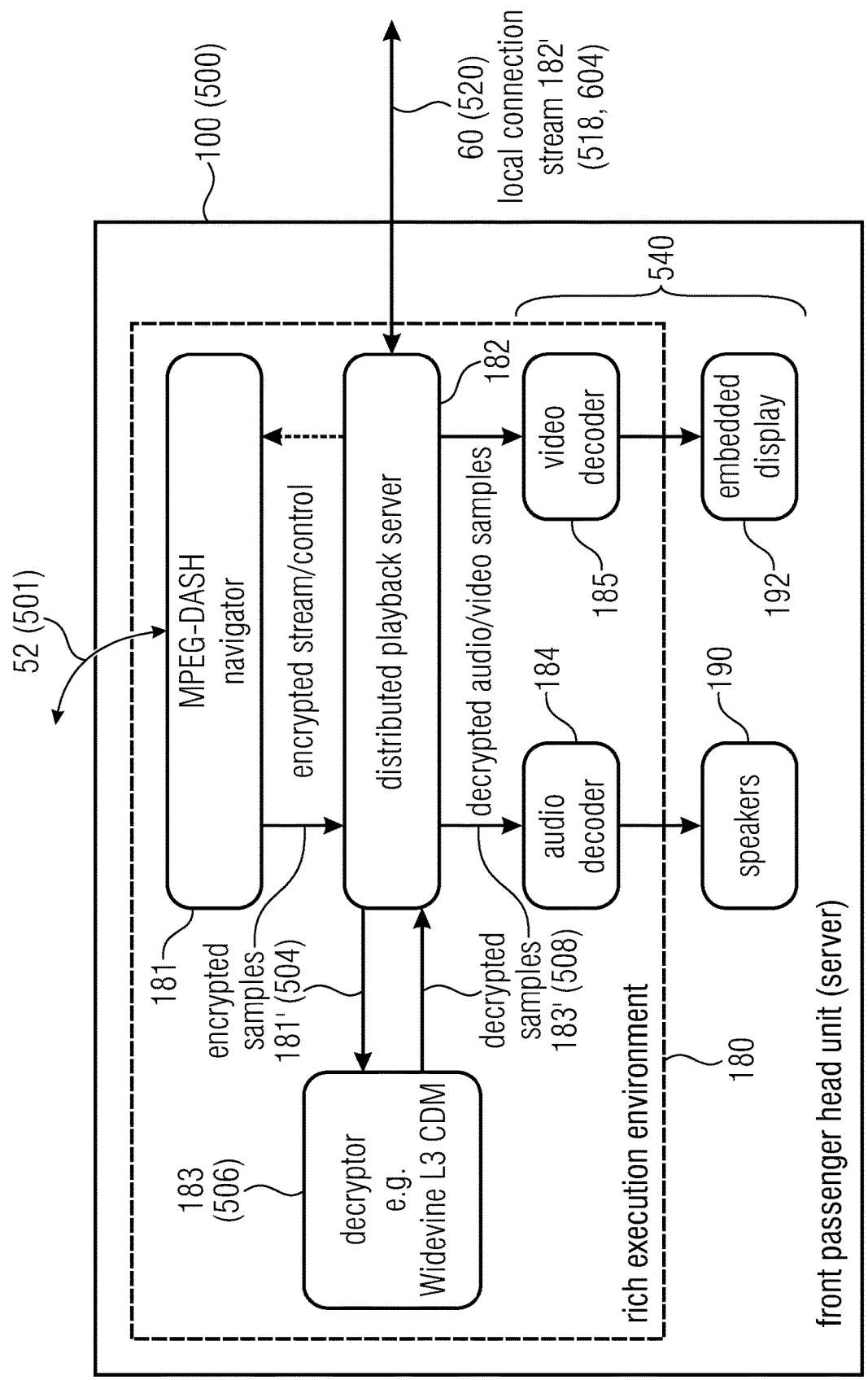
Figure 1C:
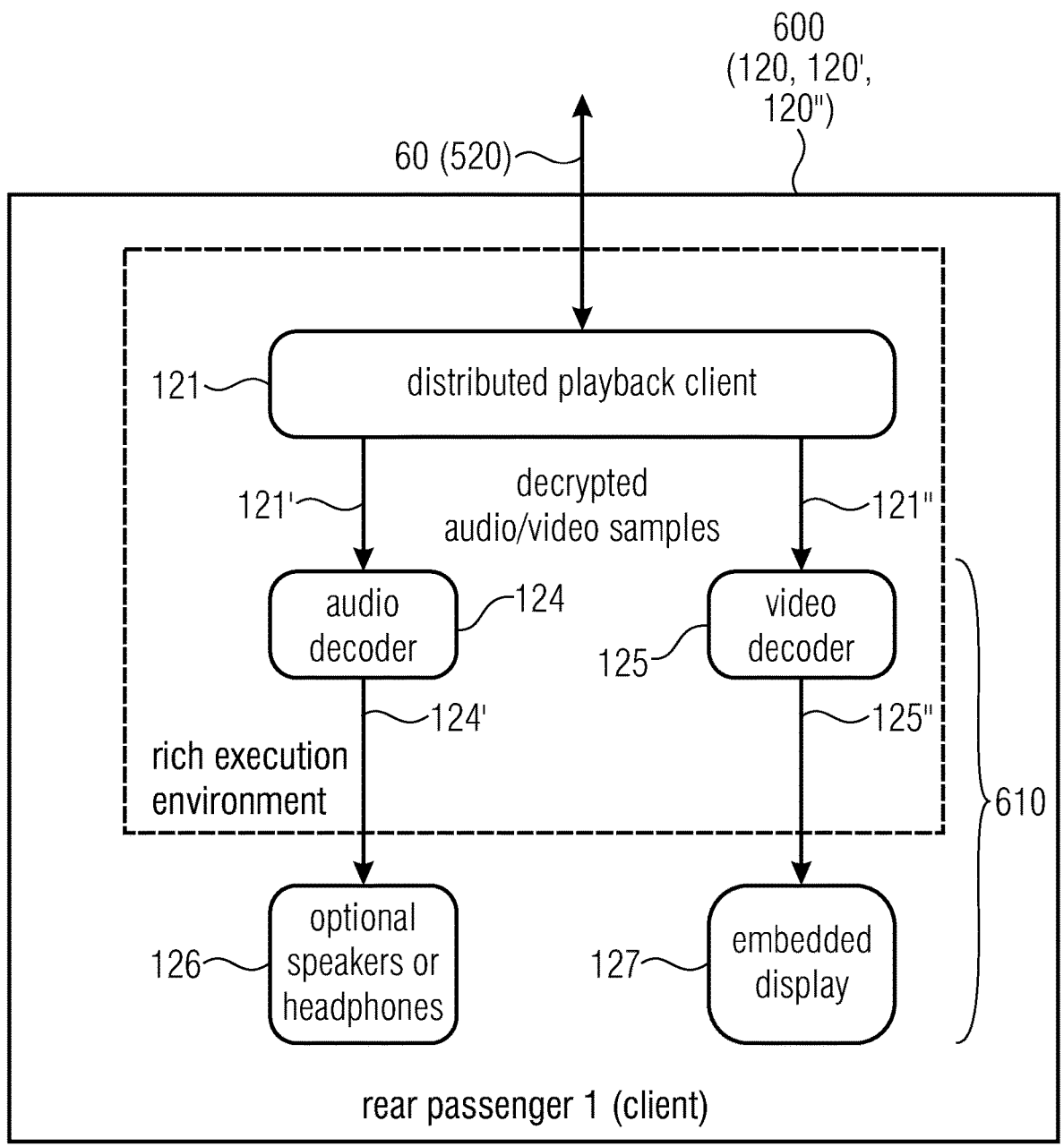
Figures 1, 2:
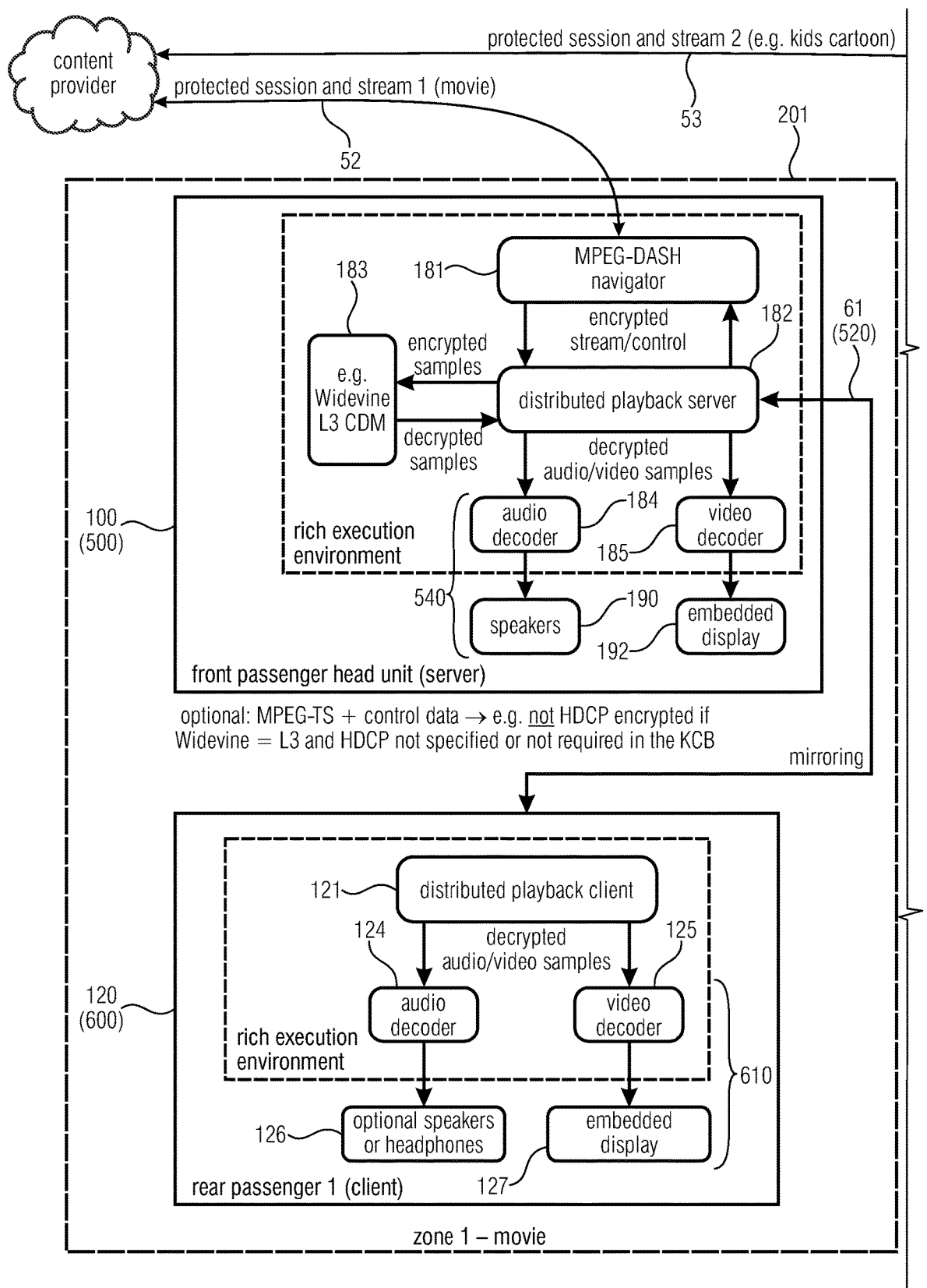
Figure 2:
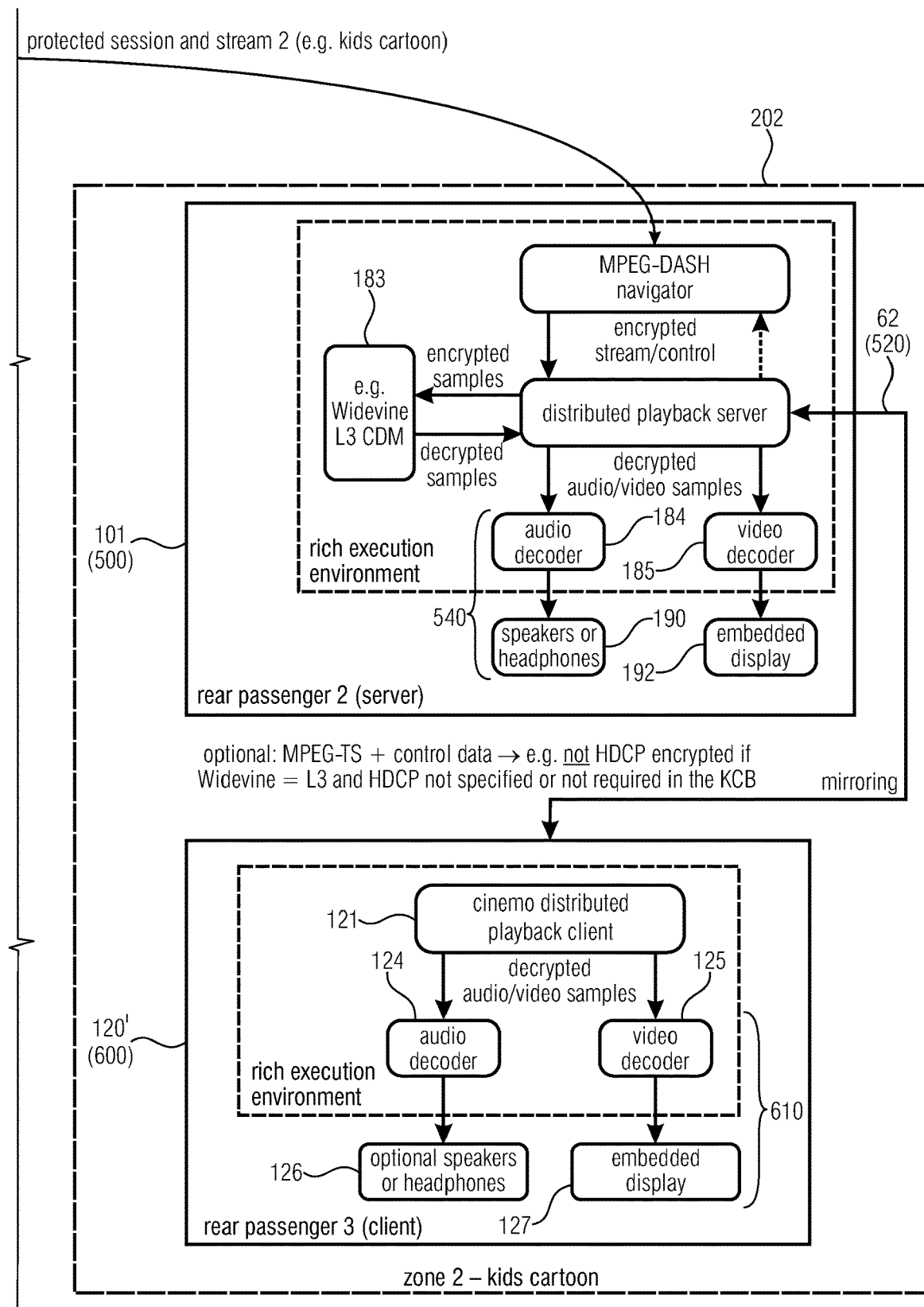

FIGS. 1*a*, 1*b*, and 1*c* show a local system 10, e.g. for the provision of media streams (where media may be, for example, audio and/or video). The local system 10 may permit users to enjoy audio and/or video (e.g. music, radio transmissions, tv transmissions, pictures, shared multimedia files, infotainment etc.). The local system 10 (or at least some elements thereof) may be positioned in a particular physical environment. The physical environment may be, for example, a vehicle (which may be a car, a bus, etc.) or a manned environment of the vehicle (e.g. a wagon of a train, the cabin of a truck, a cabin in a ship, the cockpit or another environment of an airplane, etc.). In alternative, the local system 10 (or at least some elements thereof) may be located in a domestic physical environment (e.g., a room, a house, etc.).

The local system 10 may include a distributed playback (DP) master device 100 (which may operate as a server) which may be the DP master device 500 of FIG. 1. The local system 10 may include a plurality of client devices (e.g. three, but their number may change from 1 to more than one, e.g. 10). Each client device 120, 120', 120" may be one of DP client devices 600 of FIG. 6, for example. Each client device 120-120" (600) may reproduce (render) media content (e.g. video, through a display and/or audio, through a loudspeaker) to a user, e.g. after having decoded and (in case) decrypted a stream (e.g. the media stream 518, 604) provided by the DP master device 100 (500).

The DP master device 100 and DP client devices 120, 120', 120" (600) may form a digital local distributed network. The DP master device 100 and each of the DP client devices 120-120" may be devices which are separated from each other and are positioned in different parts of the physical environment (e.g. a vehicle). In examples, they may communicate with each other (e.g. uniquely) through communication networks (e.g., through the local connection 60).

In examples, the DP master device 100 may be, or comprise, or be part of, a head unit (HU), e.g. in a vehicle. The DP master device 100 may be, for example, fixedly installed (e.g., integrated or incorporated) in the physical environment. E.g., the DP master device 100 may be fixedly installed in, and stably linked to, or otherwise integrated or incorporated to, the vehicle. The DP master device 100 may be marketed together with the vehicle. The DP master device 100 may have a power supply (not shown) which is not internal, but is provided by an external storage source (e.g., battery of a car, of an airplane, etc.) of the physical environment.

Each client device 120, 120', 120" (600) may be either a device fixedly installed in the physical environment (e.g., in the case of a vehicle or more specifically a car, a seat unit, such as a rear seat unit, or a front seat unit, etc.), or a personal device (such as a personal user equipment, UE, a tablet, or another BYOD, bring-your-own-device, device). In some examples, at least one of DP client devices 120, 120', 120" (600) is uniquely a fixedly installed device. The power supply of the fixedly installed client device 120, 120', 120" may be an external power source (e.g., battery of a car, of an airplane, etc.).

In alternative examples, at least one DP client device 120, 120' or 120" (600) is a personal device. At least one personal device may be a user equipment (UE). At least one personal device may be a tablet. At least one personal device may be a smartphone. At least one personal device may be a personal computer. The power source of the personal device may be an internal storage unit (e.g., internal batteries), which may in turn be recharged by an external power source (e.g., battery of a car, of an airplane, the mains etc.). In some examples, some client devices are fixedly installed devices (e.g., a rear seat unit, or a front seat unit, etc.), while some other are personal devices (e.g., personal devices).

The DP master device 100 (500) may digitally transmit encoded and (in case encrypted) streams to the DP client devices 120, 120', 120" (600). The DP master device 100 may be connected with the DP client devices 120, 120', 120" through a local connection 60 (which may be the local connection 520 discussed above). The local connection 60 (520) may be a trusted (or protected) local connection: only authorized DP client devices are admitted to the local connection 60, and in particularly to decrypt the media stream provided by the DP master device 100. The local connection 60 may be, for example, supported by a digital local communication network. The local connection 60 may imply communications according to standard, such as a WiFi, WLAN, etc. The local connection is wireless (e.g., based on electromagnetic waves in radiofrequencies). The local connection 60 may be understood, for example, as supporting a DP session. Through the DP session, encoded and encrypted media streams may be provided (e.g. continuously) to the DP client devices 120, 120', 120'.

The local connection 60 may be a mirroring connection (see also above). The local connection 60 may be a synchronized local connection (e.g. through techniques such as those discussed above), so that all the DP client devices 120, 120', 120" receive, (if needed) decrypt, decode and render the data stream at the same time. In this way, it is possible to provide the media content (e.g., reproduce sounds, display videos, etc.) synchronously in the different loudspeakers disseminated in the environment.

In general terms, the DP master device 100 may receive streams from the above-mentioned content provider 50. The content provider 50 may be understood as a remote entity which provides (e.g. on demand) streams to the DP master device 100.

The remote connection 52 may be based on a digital remote communication network (the remote connection 52 may be the same of the remote connection 501 above). The remote connection 52 may be based, for example, of a geographical communication network, a wireless mobile phone network (3G, 4G, 5G, UMTS, GSM, or other mobile-phone standards). In some cases, the content provider 50 may be associated to a modem, a router, etc. The remote connection 52 is a wireless connection. Therefore, a plurality of users (e.g. each associated with a particular DP client device) enjoy the video and audio remotely provided from the content provider 50 to the DP master device 100 through the remote connection 52, and retransmitted from the DP master device 100 to each DP client device 120, 120', 120".

In examples, devices (e.g., DP master device 100 or DP client device 120-120") may be ranked according to specific levels of security. For example, the levels of security may be according to the standard Widevine (e.g., L1 being the maximum level of security, L2 being a level of security lower than L1, L3 being a level of security lower than L2, L4 being a level of security lower than L4). A device encrypting a stream according to high-bandwidth digital content protection (HDCP) may be understood as having a level of security lower than a device encrypting a stream according to any level of Widevine.

It may be possible to discriminate between trusted environments and non-trusted environments: the trusted environments may be understood as having higher level of security than non-trusted environments. A single device may encompass, therewithin, both a non-trusted environment (from which it is admitted that some signal is maliciously obtained) and a trusted environment. While from the non-trusted environment it may be admitted that some signal is maliciously obtained, it is excluded (at least to a reasonable level of certainty) that from the trusted environment a media signal could be maliciously obtained.

Streams encrypted by devices with higher level of security may be understood as having a higher level of security than streams encrypted by devices with lower level of security. For example, a stream encrypted according to Widevine may be understood as having a level of security higher than a stream encrypted according to HDCP.

Also the connections (e.g., the remote connection 52 and the local connection 60) may have different levels of security. A connection in which exchanged streams are encrypted by a highly-secure device will have higher levels of security than connections in which streams are exchanged which have lower level of security.

Also the channel may have different levels of security: for example, a wireless transmission may be understood as having a lower level of security than a wired transmission, as it is in general easier to receive and decode signals wireless signals.

Moreover, also certified electronic units (e.g., some certified environments) may be understood as having a level of security higher than the non-certified units.

In general terms, the level of security of each device, stream, connection, environment, etc. may be associated with the particular techniques which are implemented for avoiding the malicious reception and/or decoding of the stream transmitted by the DP master device 100 (500). The more the effort is needed for spoofing a stream, the higher the level of security of the device, channel, stream, connection, environment, etc.

In view of the above, the DP client device 100 may establish a protected remote connection 52 with a remote content provider 50, and receive a media stream from the remote content provider 50. The media stream is encoded (compressed). The media stream may be encrypted according to a first encryption standard (e.g., Widevine L3). The DP master device 100 may internally decrypt the encoded media stream received from the remote content provider 50 to generate a decrypted encoded media stream. The DP master device 100 may (in some cases) internally re-encrypt the decrypted encoded media stream by using a second encryption standard. The second encryption standard may be, in some examples, a different encryption standard from the first encryption standard (e.g., it may be HDCP). In other examples, however, the second encryption standard may be the same of the first encryption standard. In other examples, the decrypted stream may be simply relayed to DP client devices without being re-encrypted.

After having internally re-encrypted the encoded media stream, the DP server device 100 may transmit the encoded re-encrypted streams to the plurality of client devices 120, 120' and 120".

The DP master device 100 may include at least one of the components below and/or may perform at least one of the functions described below. The DP server device 100 may be the front passenger heading unit, for example, in a case of application to a vehicle.

The DP server device 100 may include a rich execution environment 180. The DP server device 100 may include or be connected to an audio reproduction unit 190 (e.g., one or more speakers) and/or a video reproduction device 192 (such as a display, e.g., an embedded display).

The DP server device 100 may include a navigator 181. The navigator 181 may be, for example, a motion picture expert group, digital audio stationary head, MPEG-DASH, navigator. More in general, the navigator may be or include a controller. The navigator 181 may receive the encrypted and encoded stream through the remote connection 52, e.g., through communication hardware, such as an antenna. In some cases, the connection 52 may include some elements which operate like bridges, such as mobile phones or other UEs, and so on.

The navigator 181 may provide the encrypted stream 181', e.g. to a distributed playback server 182 (DP server). The encrypted stream 181' ("encrypted samples) may be the first encrypted media stream 504 of FIG. 5. The DP server 182 may be an element of the DP master device 100 which manages the transmission of the stream to the DP client devices 120, 120', 120". The navigator 181 and the DP server 182, operating in coordination with each other, may be understood as embodying, for example, the communication interface 502.

The stream 181' (504) may also be provided to an audio decoder 184 and/or a video decoder 185 (which may be internal units) so that the stream is provided to the speakers 190 and/or the embedded displays 192. At least some of the elements 184, 185, 190, and 192 (when present) may form the above discussed embedded media renderer 540.

The encrypted stream 181' (504) as obtained by the DP server device 100 is not directly provided to the local decoders 184 and 185 (or more in general to the embedded media renderer 540) and to DP client devices 120-120", as the stream 181' (504) is to be decrypted. For this purpose, the DP server 182 may provide the encrypted stream 181' to a decryptor 183 (e.g., a Widevine L3 CDM, or more in general a first standard), which may be an example of the decryptor 506. The decryptor 183 (506) may provide the decrypted samples 183' (which may be an example of the decrypted media stream 508) back to the DP server 182.

The DP server 182 may, accordingly, provide the decrypted audio and video streams (here, indicated collectively by 183') to the internal audio decoder 184 and/or the internal video decoder 185 (if provided), so that a decoded audio signal 184' is provided to the speakers 190 and/or a decoded video signal 184' is provided to the embedded display 192, or more in general to the embedded media renderer 540.

In some cases, the DP server 182 may have encryption capabilities and may re-encrypt the previously decrypted media stream 183' and provide the re-encrypted media stream (here indicated as 182' and embodying the stream 518 and 604 of FIGS. 5 and 6) to the DP client devices 120-120" through the connection 60 (in those cases, the DP server 182 may also embody the encryptor 516 of FIG. 5). (In other cases, the DP server 182 does not re-encrypt the media stream 183' (508) and send it in plaintext to DP client devices through the local connection.)

Accordingly, the DP server 182 may provide a decrypted version 183' of the stream received from the content provider 50 and may send an output media stream 182' (which may be re-encrypted) of the stream 181' (504).

Hence, while the decrypted version 183' of the stream 181' is provided to the internal decoders 184 and 185 with low delay, the re-encrypted (and still encoded) version 182' of the stream 181' is distributed to the DP client devices 120-120" with additional unwanted delays caused by the re-encryption and the transmission through the connection 60.

As explained above, it has been understood that it is possible to configure the DP server device 100 (500) to introduce artificial delays for the decrypted audio and video streams 183' (508) as provided to the internal decoders 184 and 185, in order to compensate for the unwanted delays caused by re-encrypting the decrypted stream 183' and transmitting the re-encrypted stream 182' to the DP client devices 120-120". This solution synchronizes the speaker 190, the display 192 and/or the displays 127 and the speakers 126 of the DP client devices 120-120" and, more in general, the embedded media renderer 540 with the media renderers of DP client devices. The solution may be based on techniques described above, e.g. by also providing the DPI 510 (or other timing information) defining, for example, the presentation time at which media content is to be transmitted. In FIGS. 1a-1c the DPI adder 512 may be internal to the DP server device 182. The DPI 510 is not shown in FIGS. 1a and 1b, but may be between the DP server 182 and the embedded media renderer 540, and may also be encoded in the stream 182' (518, 604) as transmitted from the DP server device 100 (500) to DP client devices 120-120" (600).

(It is noted that it is not necessary for the DP server 182 to re-encrypt the decrypted stream 183': this is because, in some examples, it may be possible to select between a re-encryption strategy and a non-re-encryption strategy. In some cases, the selection is performed by the content provider and is signalled in control data in the remote connection 52. In other cases, the selection is performed at the factory, e.g. by selecting a particular flag.)

Hence, a client device 120-120" (600) may receive the re-encrypted stream 182' (518, 604). A DP client 121 may receive the re-encrypted stream 182'. The DP client 121 implement the communication interface 602 of DP client device 600 (see FIG. 6).

If the stream 182' (e.g. 518, 604) as sent by the DP master device 100 (600) is encrypted, the DP client 121 may decrypt it, to obtain a decrypted stream (e.g. including one of an audio stream 121' and a video stream 121"). The decrypted stream 121' and/or 121" may be the decrypted media stream 608. Each client device 120-120" (600) may have a client-internal decoder (e.g., an audio decoder 124 and/or a video decoder 125). The decoded video signal 124' may be provided to a speaker 126 of (or connected to) DP client device. The decoded video signal 125' can be provided to a display, e.g., an embedded display 127 of (or connected to) DP client device. The above mentioned media renderer 610 may include at least some of the elements 124, 125, 126. 127.

In examples, at least one of the DP client devices 120-120" may have an additional input unit (not shown). The additional input unit may permit to process the stream 121' as decrypted but before being fed to the audio decoder 124 and/or the video decoder 125. Hence, a user inputting commands at the DP client device (and in particular, at the input unit), may process the stream before being decoded and has the possibility of making additional selections. If, for example, the user does not want a particular track or channel internal to the audio stream 121', he/she may input a selection accordingly, so that the decoders avoids providing the particular track or channel. Such an effect would not be possible if the DP server device 100 provided the signal 182' to DP client devices after decoding. Therefore, the DP client device 120-120" may advantageously include (e.g., embedded thereto and/or internal therein) an input unit which may permit selections on the decrypted audio and/or video stream 121' before the stream 121' is decoded.

Alternatively or in addition, the protected local connection 60 may also support the transmission of commands from at least one of the DP client devices 120-120" to the DP master device 100 (e.g. through feedback packages 1380). A user may input a selection, for example, through an input unit, which may be the same of the one discussed above (or may be similar to that), and may include input means for performing the selection (e.g., digitally). The DP client 121 will accordingly transmit the command to the DP server 182, which, in turn, will perform the selection, e.g. for the whole stream 182' as provided to the whole plurality of decoders (184, 185, 124, 125).

Notably, in some examples, the media renderers 610 of the DP client devices 120-120" (600), together with the embedded media renderer 540 of the DP master device, may be configured to respect the DPI (and in particular the presentation time information) as sent by the DP master device 100 (500). Hence, the rendering at all the devices (master and slaves) are coordinated. The DP client 121 may therefore be the DP extractor 612.

In some examples, the DP client devices 120-120" (600), may receive the beacon 1320 and/or send the feedback packets 1380 as in the examples above.

It is not necessarily requested for the DP client devices 120-120" (or at least one thereof) to necessarily be Widevine devices, even though the original stream has been provided by the content provider 50 as encrypted according to Widevine. The DP client devices 120-120" may simply be normal, off-the-shelf devices (which can, for example, be simply compliant to the HDCP standard, but not to the Widevine standard). In general terms, the standard according to which the stream is originally provided from the content provider 50 to the DP master device 100 may have no relationship at all with the second encryption standard used for the stream 182' as provided to the DP client devices 120-120". Further, in some examples the stream 182' as sent from the DP master device 100 (600) to the DP client devices 120-120" is not encrypted at all.

The implementations are much feasible and also permit, in some examples, the use of general purpose user equipments, UEs, e.g., mobile phones, smart phones, tablets, personal computers, and so on.

Even though in some examples the DP master device 100 is a pre-installed device (e.g., the front passage head unit in a vehicle), in some examples the DP master device 100 is chosen among a plurality of distributed devices (e.g., by election). Hence, in some examples any of the DP client devices 600 (120, 120', 120") may become the DP master device. In other examples, the DP master device is fixed (e.g. fixedly associated to a vehicle).

In examples, the local system 10 may be partitioned into at least one first partition 201 and one second partition 202, as shown in FIG. 2. Accordingly, it is possible to establish the protected local connection between the DP master device (which, in this case, is the first DP master device 100) and at least one selected DP client device 120, by using a partitioned connection 61 (which may embody an instantiation of the local connection 520). The second partition 202 may include a second master device 101 (which may also embody the master device 500 of FIG. 5) connected, through a second protected connection 62 (which may embody an instantiation of the local connection 520), with at least one DP client device 120'. The second DP master device 101 is not the same as the first DP master device 100. In some examples, the second DP master device 101 of the second partition 202 is chosen among one of the DP client devices 120-120". The choice may be made, for example, by the first DP master device 100 (in some other cases, the choices made by election are from a plurality of similar devices), or, in other examples, by election. For example, in FIG. 2, the second DP master device 101 may be the device 120" (which acts as a DP client device in FIGS. 1a-1c), in case of selection, e.g. by election or manual selection.

In general terms, any of the features described for the local system 10 of FIGS. 1a-1c can also be applied to the system of FIG. 2. Here, only some features specific to the partitioning are discussed. At first, the first DP master device 100 and a second DP master device 101 may be connected to one single wireless modem (e.g., 4G/LTE/5G) which can be, for example, a modem fixedly installed (e.g., integrated or incorporated) in the vehicle. The different local connections 61 and 62 (both embodying the local connection 520) may be selected on the fly, e.g. by selections operated by each user. Therefore, even if the DP client device 120 currently pertains to the partition 202 and DP client device 120' currently pertains to the second partition 202, this could change: it may occur the user of the DP client device 120 gets bored of the first stream provided in the first partition 201 and wants to switch to the video or the same provided in the second partition 202. Here, the user may simply perform a selection so that the DP client device 120 is connected through the second connection 62 from the second DP master device 101 and receives the streams provided by the second DP master device 101. However, the functionality discussed above for FIGS. 1a-1c remain valid for the functionalities of the system of FIG. 2 (reminder that each connection 61 and 62 is independent from the other ones). Notably, in some cases, it is possible the first or second DP master devices 100 and 101 may be associated to different accounts (or in some cases, are associated to the same account, such as family accounts, with the possibility of choosing different profiles and/or services, such as "movie" and "kids cartoon").

In FIG. 2, the electronic components of the different devices 100, 101, 120 and 120' are indicated with the same reference numerals of FIGS. 1a-1c. The signals for the first partition 201 are indicated with the same reference numerals of FIGS. 1a-1c. Basically, the content provider 50 provides, through two different protected remote connections 52 and 53 (each of them instantiate the remote connection 50), encrypted streams respectively to different DP master devices 100 and 101. Each encrypted stream may be respectively decrypted by a decryptor 183 (506) internal to each of the DP master device 100 and 101, to obtain an encoded decrypted stream, respectively. Each DP master device 100 and 101 may provide the decrypted stream, respectively, to its embedded media renderer 540 (e.g. including one internal audio decoder 184 and/or one internal video decoder 185). The internal audio decoder 184 of each of the DP master devices 100 and 101 may provide a decoded audio signal, respectively, to an internal or embedded speaker or headphone 190 internal or connected to each of the DP master device 100 or 101. The internal video decoder 185 of each of the DP master device 100 and 101 may provide the decoded video signal to the embedded display 192 internal to or connected to the DP master device 100 and DP master device 101, respectively. Further, each of the DP master devices 121 and 122 transmits, through the digital protected local connection 61 and 62, respectively, a (maybe re-encrypted) version of the decrypted stream. Accordingly, each DP client 120 and 120' (600) may obtain a decrypted audio and/or video stream. Each client device 120 and 120' may decode the audio stream to obtain an audio signal to be provided to the speaker or headphones of or connected to the DP client device 120 or 120', and/or a video signal to be provided to the embedded display 127 internal to or connected to each of DP client device 120.

Accordingly, it is possible to understand that the streams in the different partitions 100 and 101 are processed by similar hardware units of different devices, but the streams are different and the finals video signals and audio signals are different. For example, some passengers of a vehicle can enjoy a film, while others can enjoy cartoons.

In general terms, each DP master device 100 (and 101, respectively) of each partition 61 (and 62, respectively) may be responsible for synchronizing:

the rendering of the stream provided to the DP client devices 120 of its partition 100 with the streams provided to the internal decoders 184 and 185.

For example, while the DP master device 100 (500) may introduce delays to the streams to be rendered by its embedded media renderer 540 (to cope with the delays associated with the re-encryption and the transmission through the first channel 61 to the distributed client devices 120 and the subsequent re-decryption performed by the DP client devices of the first partition 100), the second DP master device 101 may introduce different delays to the decrypted streams provided to its embedded media renderer 540 (to compensate for the delays in re-encoding the stream, transmitting the re-encoded stream through the second channel 62, and re-decrypting the stream at the DP client devices of the second partition 202). As explained above, it is, in general, important to synchronize the devices of each partition and the synchronization of different partitions may be in general not necessary.

Figures 1, 3A:
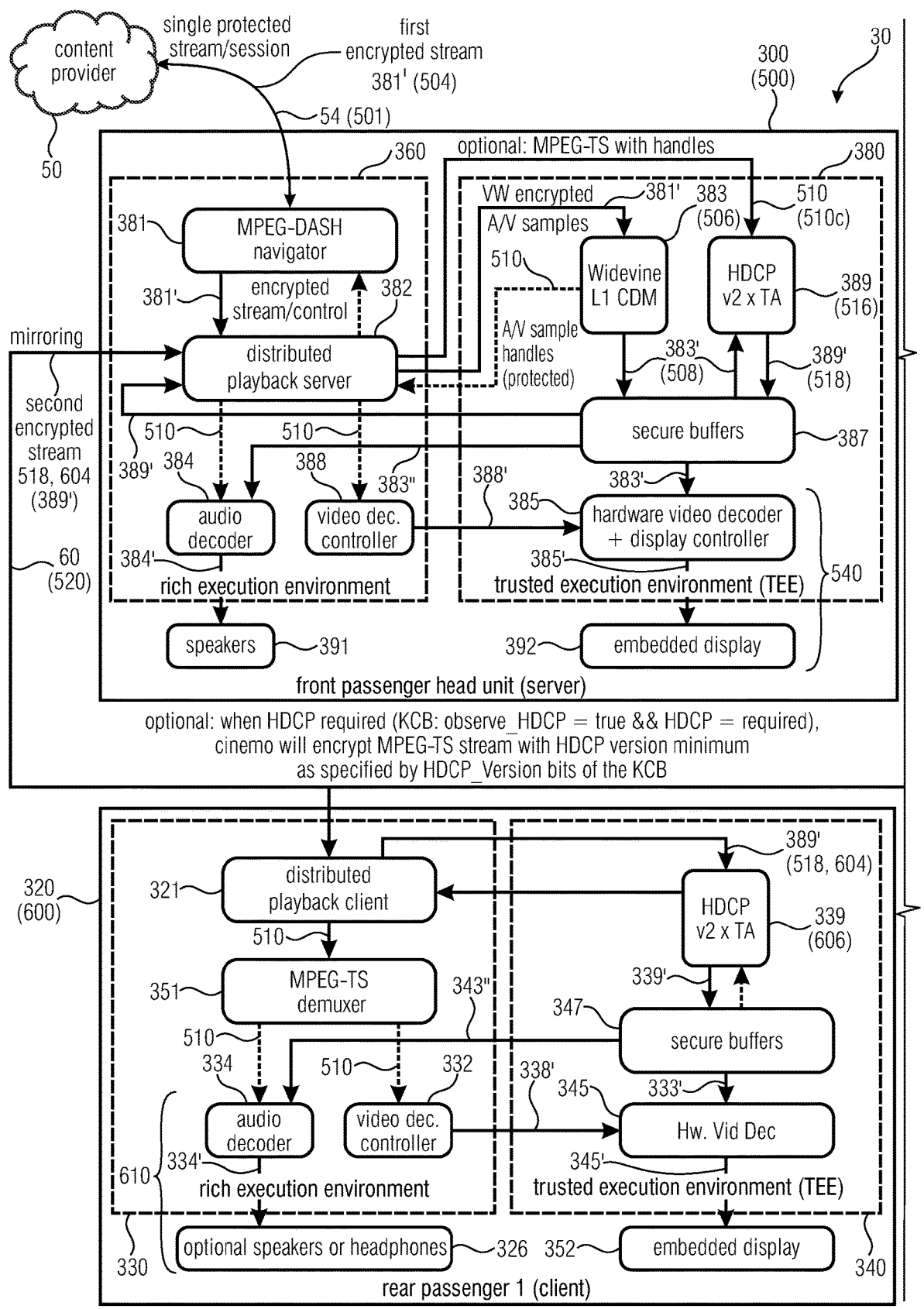
FIG. 3a shows an example of a local system according to an example.
Figures 2, 3A:
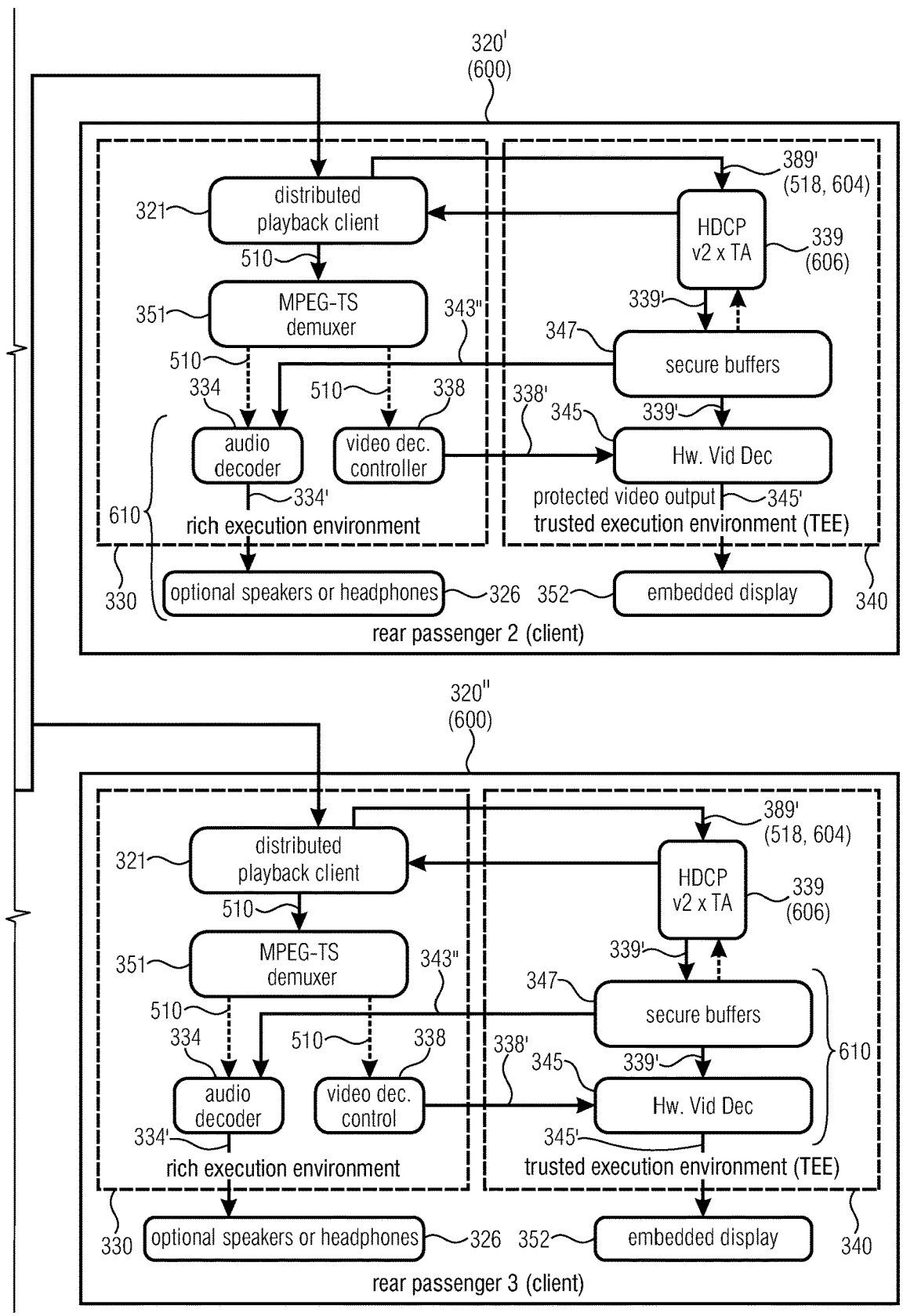
Figure 3B:
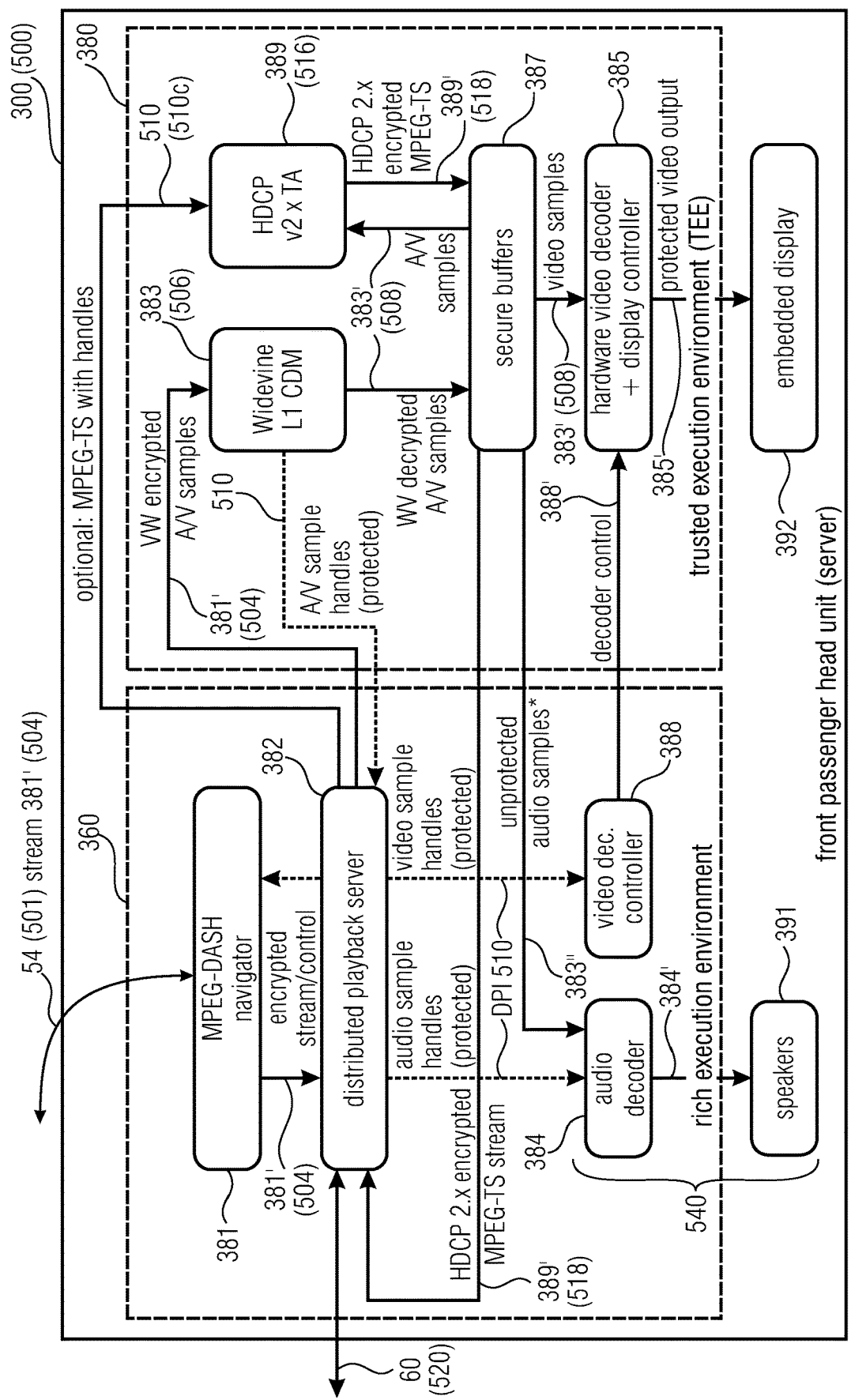
Figure 3C:
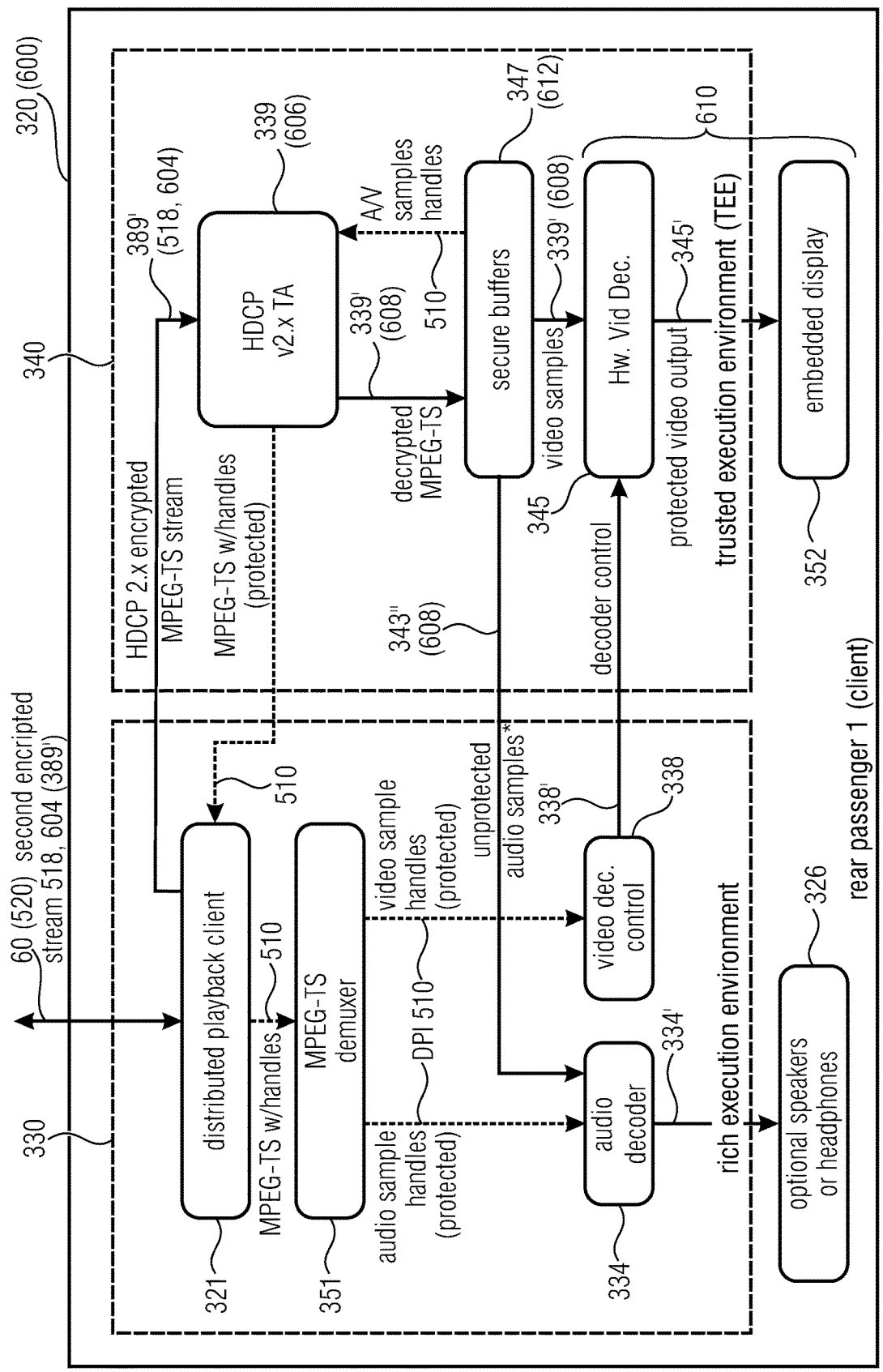

FIGS. 3a-3c show another embodiment of a local system 30 having a DP master device 300 (e.g. embodying the DP master device 500 of FIG. 5) which receives a media stream 504 through a remote connection 54 (e.g. embodying the remote connection 501 of FIG. 5) from a remote content provider 50. The remotely received stream 504 is a media stream which is encrypted according to a first encryption standard. The DP master device 300 may transmit (e.g., by mirroring) a version 518 of the stream 504 after having decrypted the stream 504 and after having a re-encrypted the decrypted stream 508 according to a second encryption standard (the second encryption standard may be the same as of or different from the first encryption standard).

The DP master device 300 (500) may also comprise the media renderer 540 (see above), which may comprise at least one of:

internal audio decoder(s) 384;
internal video decoder(s) 385,
embedded speaker(s) or (connections to external speakers) 391
embedded display(s) 392.

In this example, the DP master device 300 is subdivided (partitioned) into a trusted environment 380 and a non-trusted environment 360. Both the environments 380 and 360 may coexist within the same hardware device, e.g. confined within the same internal equipment (e.g., within the same housing). The environments 380 and 360 may be, for example, placed in two different boards stably or fixedly connected to each other and/or to other elements of the same hardware components (e.g. the housing). The environments 380 and 360 may be associated to different portions of the DP master device 300. For example, the environments 360 and 380 may be supplied by the same power supply. Alternatively or in addition, the environments 360 and 380 may have the same ground connection or reference connection. Alternatively or in addition, the environments 360 and 380 may be connected to the same internal clock. Alternatively or in addition, the environment 360 and 380 are not necessarily electromagnetically insulated from each other. The media renderer 540 may be partitioned in one first trusted portion (e.g. formed by the video decoder(s) 385 and be embedded display(s) 392) in the trusted environment 380) and a non-trusted portion (e.g. formed by the audio decoder(s) 384 and the embedded speaker(s) or connections to external speakers 391).

The trusted environment 380 has a level of security that is higher than the non-trusted environment 360. This does not mean that the non-trusted environment 360 shall totally unprotected: however, that the effort for illegally gaining the access to the multimedia content in the trusted environment 380 (or to illegally decrypt a stream generated in the environment 380) is much higher than the effort for illegally obtaining multimedia content from the non-trusted environment 360 (or to illegally decrypt a stream generated in the non-trusted environment 360). The trusted environment 380 may be, for example, a certified environment. In some cases, the trusted environment 380 may be capable of decrypting or encrypting a stream according to a Widevine encryption standard. The trusted environment 380 may re-encrypt the decrypted stream by using a second encryption standard (e.g., a HDCP). The trusted environment 380 may, for example, decode the video stream and/or display the decoded video signal. In examples, the audio streams may be either directly decoded by the non-trusted environment 360 or may be decoded by the trusted environment 380 and provided to an audio decoder, e.g. within the non-trusted environment 360. The streams may be re-encrypted in the trusted environment 380 according to the second standard (e.g., HDCP) and may be retransmitted to the plurality of client devices 320, 320', 320" in the second encryption standard.

Each of the DP client devices 320-320" (600) may be in turn partitioned between a trusted environment 340 and a non-trusted environment 330. The trusted environment 340 may be used, for example, for re-decrypting the obtained encrypted media streams 518 or to control the display of the decrypted signals in the trusted environment 340 (while other streams, e.g., the audio streams, may also be decoded in the non-trusted environment 330).

It may be appreciated that, in the example of FIGS. 3a-3c, the video streams, when decrypted, do not exit the trusted environment, or at least are not fed back to the non-trusted environment. Even when the stream passes through a non-trusted environment, it is notwithstanding encrypted. Accordingly, it is virtually never possible to illegally arrive to the multimedia content, neither by illegally decoding the encrypted stream, nor by entering into the hardware of the trusted environment 380.

Moreover, the synchronization between the different devices may be performed in the trusted environment 380, without the possibility of illegally obtaining the audio or video signal from the non-trusted environment 380.

Feature-by-feature description of the local system 30 is here provided. The local system 30 may include a DP master device 300 (embodying the DP master device 500), which may receive an encrypted media stream 381' (embodying the encrypted media stream 504) from a content provider 50 through a protected remote connection 54 (embodying the remote connection 501). The stream 381' (504) remotely received from the content provider 50 may then be encrypted according to a first encryption standard (e.g., Widevine, e.g., L1). The encrypted stream 381' (504) may be received by a navigator 381 (which may be analogous to the navigator 181 discussed above). The navigator 381 may be positioned in the non-trusted environment 360. The navigator 381 may provide the encrypted stream 381' as received from the content provider 50 to a DP server 382 or other units of the DP master device 300, such as a DP server 382. The navigator 381 and the DP server 382 may be or implement the communication interface 502 of FIG. 5. The DP server 382 may have analogous functions to those of the DP server 182 discussed for FIG. 1a. However, in this case the DP server 382 lacks encryption capabilities. The DP server 382 may be in the non-trusted environment 360.

The DP server 382 may provide the encoded stream 381' (encrypted according to the first encryption standard, e.g. Widevine) to the trusted environment 380.

Internally within the trusted environment 380, a first decryptor 383 (e.g. Widevine decryptor) may decrypt the encrypted stream 381' (504) to obtain a decrypted stream 383' (508). The first decryptor 383 may embody the decryptor 506 of FIG. 5. The decrypted stream 383' (508) may be provided, without exiting from the trusted environment 380, to secure buffers 387 internal to the secure environment 380. The decrypted stream 383' (508) may be provided to the embedded media renderer 540, e.g. to a trusted decoder (e.g., hardware video decoder+display controller) 385 without exiting from the trusted environment 380. The trusted decoder 385 may be a video decoder. (In other examples, however, it may be an audio decoder or a video and audio decoder). The trusted decoder 385 is internal to the secure environment 380. It is noted that a portion 383" (e.g. an audio portion) of the decrypted stream 383' may have a different fate from that of the video portion of the decrypted stream 383' (e.g. it may be output to the no-trusted environment 360).

The decoded video signal 385' (decoded media content, or protected video output) as decoded by the decoder 385 may be provided to an embedded display 392 (speakers could also be provided in other examples).

From the secure buffers 387, the decrypted stream 383' may be fed onto an encryptor 389 (e.g. encryptor 516 in FIG. 5). The encryptor 389 (516) may be, for example, an HDCP encryptor. The encryptor 389 (516) may implement an encryption technique which is different from the encryption of the first encryptor 383 (but in some examples it may be the same).

The encryptor 389 (516) may output a second encrypted version 389' (518) of the stream received from the remote content provider 50, i.e. a second encrypted stream 389'. The second encrypted stream 389' may be provided to the secure buffers 380 without exiting from the secure environment 380.

From the secure buffers 387, or more in general from the trusted environment 380, the second encrypted stream 389' (518) may be provided to the DP server 382 (or more in general, to the non-trusted environment 360). From the non-trusted environment 360 (e.g. more in particular, from the DP server 382), the second encrypted stream 389' (518) may be transmitted to the DP client devices 320-320" through the digital protected local connection 60.

As explained above, the stream 389' (518) as provided by the DP master device 300 to the DP client device 320-320" may be encrypted according to a second encryption standard (e.g., HDCP), which is different from the first encryption standard (e.g. Widevine, and in particular, one of L1, L2, L3, and L4).

In some examples, the secure buffers 387 may not be present.

In examples, some particular streams (e.g., audio streams) are not necessarily re-encrypted. Therefore, from the secure environment 380, a decrypted (and unprotected) version 383" (which may be a part of the decrypted stream 383' or 508) may be directly provided, form the trusted environment 380 to a non-trusted decoder 384 (which may be an audio decoder) internal to the non-trusted environment 360. The non-trusted decoder 384 may decode the unprotected stream 383" and provide a signal (e.g., audio signal) 384' to an internal or output unit (e.g., a speaker) 391 or an output unit connected downstream to the decoder non-trusted decoder 384. It is in general advantageous that the video streams are protected both with the first encryption (e.g., Widevine) in the remote connection 54 (501) and with the second encryption in the local connection 520 (e.g., in HDCP while the audio streams may be unencrypted 322'''). It may also be in some examples that the audio stream (or another less important stream) is provided to DP client devices in plaintext.

Some DPI (e.g. sequence number) may be extracted, for example, and provided from the decryptor 383 (506) and, for example, to the DP server 382. The DP server 382 may then provide the DPI 510 to the encryptor 389 (e.g. through connection 510c). The DP server 382 may therefore obtain the timing information (e.g., scheduled times, presentation time information, latencies, etc.) and provide it to the encryptor 389.

Notably, the encryptor 389 (516) may encrypt the stream 383' (508) by adding the DPI 510. Hence, the DPI 510 is encrypted in the second encrypted stream 389' (518). Alternatively, the connection 510c is not used, and the DPI 510 is inserted (added) by the DP server device 382 to the stream 389' (516) as provided from the secure buffers 387 to the DP server 382: in that case, the insertion of the DPI 510 to the encrypted stream 389' is in non-encrypted fashion, and therefore the DPI as encoded in the stream 389' (516) is in plaintext. In other examples, the DPI 510 may be simply inserted (e.g. in plaintext) in a beacon packet 1320 periodically transmitted by the DP master device 500 (100), like in the techniques of FIGS. 7a and 9a.

It is here not necessary to repeat the discussion regarding the timing of the rendering and the synchronization between the DP master device 300 and DP client devices.

However, the DPI may be provided to a video decoder controller 388 which may therefore control the delay of the generation of the video signals at the embedded display 392. By virtue of the presentation timing in the DPI 510 being also encoded (e.g. in data field 1314) in the payload packets 1310 or in the beacon packets 1320 of the second encrypted stream 389' (518) as sent in the local connection 60 (520), the timing of the generation of the video signal 385' will be coordinated to that of the generation of the video signals at DP client devices. The same applies for the generation of the audio signal 384', which may also be conditioned by the DPI 510. The output 388' of the video decoder controller 388 may therefore trigger the generation of a particular video signal associated to a particular frame (payload packet) of the stream 383' (508) on the basis of the timing information in the DPI 510. Simultaneously the same is being performed at DP client devices. The video decoder controller 388 may be in the non-trusted environment 360, since there is in general no security problem if the DPI 510 is spoofed. However, the control 388' exerted by the video decoder controller 388 onto the trusted video decoder 385 may enter into the trusted environment 380 to control the generation of the video signals 385'.

As explained above, control signal 388' (based on the DPI 510) may operate so that:

in case the latency of the rendering at the DP client device with maximum delay is increased, then the controlled delay of the rendering at the embedded media renderer (540) and at the DP client devices is increased, and/or in case the latency of the rendering at the DP client device with maximum delay is reduced, then the controlled delay of the rendering at the embedded media renderer (540) is reduced or maintained.

Examples of the DP client devices 320 (which may embody DP client devices 600 of FIG. 6) are now provided (see in particular FIGS. 3a, 3c, and 6). A DP client device 320 may be partitioned between a trusted environment 340 and a non-trusted environment 330. The separation between the trusted environment 340 and the non-trusted environment 330 may be analogous to that explained for the separation between the trusted environment 380 and trusted environment 360 of the DP master device 300, and is therefore here not repeated in too many details. It is repeated, however, that the trusted environment 340 has a level of security which is higher than the level of security of the non-trusted environment 330, and that it is more difficult (or virtually impossible) to illegally arrive to the multimedia content from the trusted environment 330. The DP client device 320 (600) may be input with the second encrypted stream 389' (518, 604), e.g. originally encrypted by the encryptor 389 (516) of the trusted environment 380 of the DP master device 300 (500). Within the non-trusted environment 330, a distributed playback client (DP client) 321 may be provided. The DP client 321 may have analogous functions of those of the DP client 121 (see above). The DP client 321 may implement, in particular, the communication interface 602 of FIG. 6. The DP client 321 may provide the second encrypted stream 389' (518, 604) to a second decryptor 339 (e.g. embodying the decryptor 606 of FIG. 6), which may be part of the trusted environment 340. The second decryptor 339 (606) may output a decrypted version 339' of the encoded stream 389' (hence, the decrypted stream 339' may be the decrypted media stream 608 of FIG. 6). This decrypted stream 339' (608) may be provided, e.g. through a secure buffers 347 (e.g. internal to the trusted environment 340) to an internal, trusted decoder 345 (e.g. hardware video decoder). The trusted decoder 345 may provide a signal 345' (e.g. video signal) to an embedded output unit 352 which is within (or associated to) the trusted environment 340. Accordingly, the decrypted stream 339' (608) remains in the trusted environment 340, and the signal 345' is only directed to the embedded output unit 352 (e.g., embedded display), without passing through the non-trusted environment 330. In general terms, the stream 339' (608) and the signal 345' can be a video stream and video signal, respectively, but in some examples, it may be either an audio stream and audio signal and/or video and audio signal and video and audio stream.

From the secure buffers 347, a decrypted stream 343" (e.g. audio stream) may be provided to the non-trusted environment 330, and in particular, to a non-trusted decoder (which may be an audio decoder) 334. From the non-trusted decoder 334, a media signal 334' (which can be an audio signal) may be provided to a speaker or headphone 326.

It is also possible to have a video decoder control 338 (e.g., in the non-trusted environment 330) outputs a control signal 338' which controls the trusted video decoder 345.

The second decryptor 339 or the DP client 321 may embody the DPI extractor 612. The DP client 321 may provide the DPI 510 to the audio decoder 334 and/or the video decoder controller 338 for controlling the generation of the physical audio and video signals at the elements 326 and/or 352. A demuxer 351 may partition the DPI 510 between information for the audio decoder 334 and information for the video decoder controller 338. These examples are in case the DPI 510 (and in particular field 1315) is encrypted together with the rest of the second encrypted stream 389' (518, 604) as received by DP client device.

In case the DPI 510 is in plaintext, the DP client 321 embodies the DPI extractor 612 since the DPI 510 needs not to be decrypted (the transition 606' which in FIG. 6 bypasses the decryptor 606 may in this way be verified).

In the example of FIGS. 3a-3c, an extremely high level of security is attained: any time the stream is in decrypted form, it is either in the secure environment 380 of the DP master device 300 (500) and in the secure environment 340 of the DP client devices 320-320" (600).

Further, any of the versions of the decrypted stream, when provided to the media renderers 540 and 610 (and in particular to the decoders 384, 385, 334, 338) result being synchronized with each other: in the DP master device 300 (500), delays may be added for both the streams rendering the audio stream 383" provided to the audio decoder 384 and the video stream 383' provided to the trusted decoder 384. The delays may be controlled by the DPI 510 which takes into account the timing of the generation of the physical signals also at DP client devices 330-330" (600).

As explained above, the delays generated for the video signal 383' may be calculated so as to take into account the time needed for transmitting the stream 389' (518, 604) through the protected connection 60 (520) and the time needed to re-encrypt the stream and redecrypt the streams. Hence, the images as output by the output units (e.g., displays) 392 and 352 may result to be synchronized with each other and also the audio signals 384' and 334' (provided to the audio output devices 391 and 326) will be synchronized with each other and with the video images. Hence, all the users will enjoy the same media content simultaneously, without suffering annoying mutual delays.

In some examples, a non-encrypted media stream (e.g. audio stream) is notwithstanding provided to the secure environment 380, so that the secure environment can provide a synchronized version of the non-encrypted media stream (e.g. audio stream) to the non-trusted decoder 384 in the non-trusted environment 360, so that the media content output by the output device 391 is synchronized to that of the output device 392 in the trusted environment 380.

Figures 1, 4:
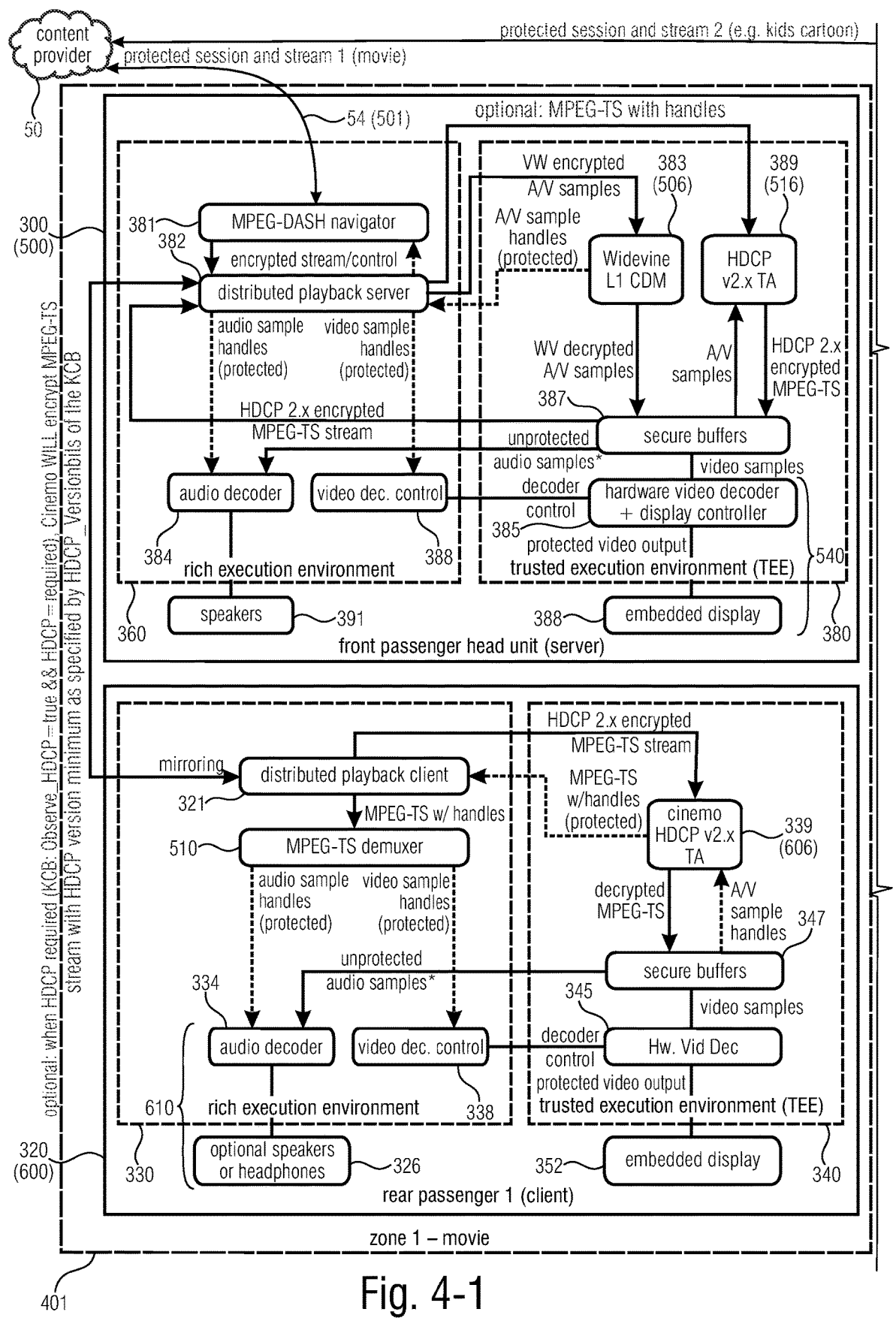
Figures 2, 4:
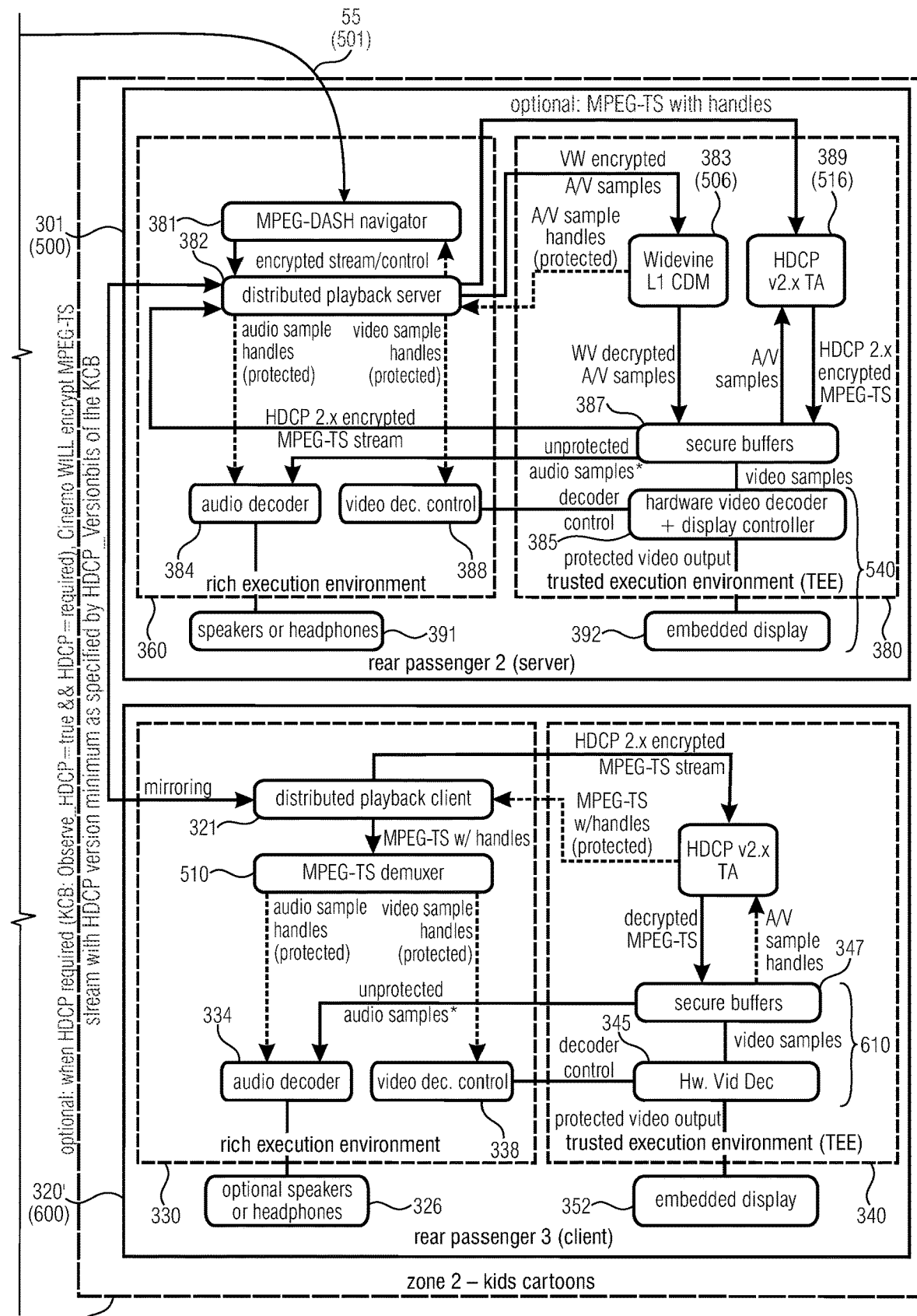

FIG. 4 shows the local system 30 which is divided into a first partition 401 and a second partition 402. The first partition 401 may include a first master device 300 and at least one DP client device 320, which are connected through a protected digital local connection 61. Further, a second DP master device 301 and at least one DP client device 320'.

Any of the features discussed above with reference to the technique discussed for the partitioning of FIG. 2 may be redirected to the technique of FIG. 4. The difference is that here that each of the DP master devices 300 and 301 is also partitioned between the trusted environment 380 and the non-trusted environment 360 (see above for the distinction between these two environments). While the DP master device 300 may be the same DP master device 300 of FIG. 3, the DP master device 301 may be, in examples, one of the DP client devices of FIG. 3 (e.g., DP client device 320"). In some cases, when it is requested to obtain two different streams from the content provider (e.g., because two different media contents are to be consumed by two different groups in the same vehicle) two remote connections 54 and 55 may be performed by each of the master devices 300 and 301, respectively. The features of each partition 400, 401 may be the same features of the system 30 of FIG. 3a. Basically, as here different streams are provided to different partitions, the synchronization is performed differently for each partition. Apart from that, internally each DP master device 300 and 301 operates like the master device 300 of FIG. 3, and each client device 320 and 320' of FIG. 4 may operate as one of the DP client devices of FIG. 3. The DP master device 301 may be chosen (e.g., by election or by decision of the master device 300) among the plurality of the DP client devices. Both the master devices 300 and 301 may be connected, for example, to the same wireless modem which may provide two different remote connections 54 and 55 (each of them embodying a remote connection 501) with a remote content provider 50.

By virtue of the examples above, all the media contents of the local system 30 (or of a partition 400 or 401) may result to be synchronized (e.g., audio and video, e.g., different signals directed to different output devices 190, 192, 391, 392, 326, 352, 326, 352).

A high degree of security is also attained. Not only is the second encrypted stream 389' (518, 604) encrypted, but it is guaranteed that the decryption and the re-encryption are performed within the secure environment 380, and that the decoded streams do not exit the trusted environments 330 and 380. Accordingly, it is also not feasible to maliciously obtain the media content by performing a connection in the non-trusted environment 360: the stream 389' (518, 604) is encrypted.

The same applies to DP client devices. The example of FIGS. 3a-3c and 4 even provides for a better level of security with respect to the example of FIGS. 1a-2, as the streams circulating in the non-trusted environment 330 are encrypted, and are only decrypted within the trusted environment 340, where the hacker cannot effectively operate.

The above notwithstanding, it is ensured that the media content as provided by speakers and/or displays is synchronized with each other.

Moreover, the compatibility of the DP master device may be guaranteed, for example, in case the first standard and the second standard are different. For example, if DP client devices 120-120" and/or 320-320" are devices configured to perform a decryption according to HDCP and the master device 100 or 300 is configured to receive the stream from the content provider according to a Widevine standard (e.g., L1 or L2 or L3 or L4), it is not necessary to change DP client devices, as it is simply possible to rely on the DP master device 100 or 300 to transmit the stream 182' and/or 389' according to the HDCP standard.

Further, as explained above, the synchronizations may be easily obtained.

Moreover, it is possible to provide playback commands from the DP client devices, so as to control the reproduction of the media content in all the devices.

The examples of FIGS. 1a-4 are not necessarily different embodiments, but at least some of them could be obtained in one single embodiment in which one mode is selected among multiple modes (this may be valid both for the DP master device 600 and the DP client devices 500). For example, there may be a mode "single stream" or "single partition" (as in FIGS. 1a-1c and 3a-3c) vs a mode "multiple streams" or "multiple partitions" (as in FIGS. 2 an 4). The choice may be made based on the users' selection.

In other cases, there may be a choice between "transmission encrypted" (e.g. using the encryptor 516 and the second decryptor 606) vs "transmission non-encrypted" (e.g. bypassing the encryptor 516 through the line 516', and bypassing the decryptor 606). This may be made on the basis of a selection, which may be made at least by the content provider 50, e.g. in view of the value of the media content provided and/or on the type of account of the user. In some examples, when it is determined that a standard with lower level of security is to be used (e.g., Widevine L3 instead of Widevine L1), then the encryptor 516 and the decryptor 606 may be bypassed, so that the output media stream 518 (604, 189') is provided in plaintext. Analogously, when it is determined that a standard with higher level of security is to be used (e.g., Widevine L1 instead of Widevine L3), then the encryptor 516 and the decryptor 606 may be activated, so that the output media stream 518 (604, 189') is encrypted.

Analogously, in additional or alternative examples it may be decided whether to use or non-use the trusted environments 340 and 380. This may be made on the basis of a selection, which may be made at least by the content provider 50, e.g. in view of the value of the media content provided and/or on the type of account of the user. In some examples, when it is determined that a standard with lower level of security is to be used (e.g., Widevine L3 instead of Widevine L1), then the trusted environments 340 and 380 may be bypassed so as to operate like in FIGS. 1a-2 and not like in FIGS. 2a-4. Analogously, when it is determined that a standard with higher level of security is to be used (e.g., Widevine L1 instead of Widevine L3), then then the trusted environments 340 and 380 may be activated, so as to operate like in FIGS. 1a-2 and not like in FIGS. 2a-4.

Notably, the selected mode is not necessarily selected by one single entity. For example, the selection may be based on requirements (e.g., associated to the particular user's account and/or the capabilities of the particular device). This may therefore drive to other modes, such as "distribution denied". For example, if the content provider needs a high level of security (e.g. Widevine L1) and the DP client devices 600 are not compliant with the high level of security needed, then the distribution of the media stream 518 (604) may be denied. Notably, however, that in some cases the DP master device 500 may still enjoy the reproduction of a particular media content, provided that the DP master device is compliant with the particular needed level of security. In that case, the DP master device 500 will refrain to send the output stream 508 (604) in the local connection 520, but will still activate its own embedded renderer 540.

The following is a characterization of examples above which is optional.

In-Vehicle Content Mirroring Use Case #1 (FIGS. 1a, 1b, 1c)
  e.g. Widevine L3, Single Zone (One Stream Mirrored to Three Client Devices)
    Front Passenger (DP master device 100) and Rear Passengers 1, 2 and 3 (DP client devices 120, 120', 120") may be connected via LAN/Wi-Fi (local connection) inside the vehicle
    data (e.g. stream 181', 504) from the content provider 50 may come through 4g/lte/5g modem of the vehicle
    front passenger unit (DP master device 100) may receive a single stream (e.g. stream 181', 504) from content provider 50 and may act as a distributed playback server
    rear passengers 1, 2 and 3 (DP client devices 120, 120', 120") may receive audio/video streams (182', 504) from front passenger and act as distributed playback clients
    audio and video may be completely synchronized (e.g. mirrored) between front passenger (DP master device 100) and rear passengers 1, 2 and 3 (DP client devices 120, 120', 120")
    widevine L3 decryption may happen on front passenger's unit (DP master device 100), e.g. at decryptor 183
    MPEG-TS Data may be sent over Wi-Fi/LAN unencrypted if either of the following conditions in the Key Control Block (KCB) of the Content Key is true:
      HDCP not specified (KCB: Observe_HDCP=false)
      HDCP not required (KCB: Observe_HDCP=true AND HDCP=not required)

In-Vehicle Content Mirroring Use Case #2 (FIG. 2)
  e.g. Widevine L3, Dual Zone (Two Streams+Mirroring)
    Front Passenger (DP master device 100) and Rear Passengers 1, 2 and 3 (DP client devices 120, 120', 120") may be connected via LAN/Wi-Fi (local connection 520) inside the vehicle
    a from the Content Provider (DP master device 100) comes through 4G/LTE/5G modem of the Vehicle
    Front Passenger (DP master device 100) and Rear Passenger 1 (DP client device 120) are watching Movie ("Zone 1") fully synchronized (mirroring). Rear Passenger 2 (DP client device 120') and Rear Passenger 3 (DP client devices 120, 120") are watching Kids Cartoon ("Zone 2") fully synchronized (mirroring)
    Movie and Kids Cartoon are being delivered as two independent sessions/streams from the Content Provider 50 (if allowed by provider/account, e.g. family account)
    Alternatively, each Zone can be receiving content from the provider using two independent accounts (it may be allowed to manage independent logins)
    Widevine L3 Decryption at block 183 happens on Front Passenger's and Rear Passenger 2's units (DP server devices 100 and 101)
    MPEG-TS Data is sent over Wi-Fi/LAN (local connection) unencrypted if either of the following conditions in the Key Control Block (KCB) of the Content Key is true:
      HDCP not specified (KCB: Observe_HDCP=false)
      HDCP not required (KCB: Observe_HDCP=true AND HDCP=not required)

In-Vehicle Content Mirroring Use Case #3 (FIGS. 1a-1c)
  e.g. Widevine L1, Single Zone (One Stream Mirrored to 3 Clients)
    Front Passenger (DP master device 300) and Rear Passengers 1, 2 and 3 (DP client devices 320, 320', 320") are connected via LAN/Wi-Fi (local connection) inside the vehicle. Data from the Content Provider 50 comes through 4G/LTE/5G modem of the Vehicle
    Front Passenger Unit may receive Single Stream 381' (504) from Content Provider 50 and act as a Distributed Playback Server. Rear Passengers 1, 2 and 3 (DP client devices 320, 320', 320") may receive Audio/Video Streams from Front Passenger and act as Distributed Playback Clients
    Audio and Video may be completely synchronized (e.g. mirrored) between Front Passenger and Rear Passengers 1,2 and 3
    Widevine L1 Decryption (decryptor 383) may happen on Front Passenger's Unit (in trusted execution environment, TEE, 380). For distribution to client devices, decrypted streams 383' (508) may be re-encrypted e.g. using HDCP 2.x protocol version as signaled in the Key Control Block of the Content Key. Video may be decoded (e.g. at 385) and rendered (e.g. at 392) in TEE. Audio may be decoded (e.g. at 384) in rich environment (e.g. non-secure environment 360), e.g. if "key always unsecure" is signaled.
    MPEG-TS Data may be sent over Wi-Fi/LAN (local connection) encrypted to client devices, where it is decrypted inside TEE 380 e.g. using HDCP 2.x TA (or another decryptor) 339 (608) and handled in the same way as on server device 300. This may be only be done if Widevine=L1 and HDCP required (KCB: Observe_HDCP=true AND HDCP=required), Cinemo WILL encrypt MPEG-TS stream with HDCP version minimum as specified by HDCP_Version bits of the KCB.
    If Widevine=L1 and HDCP not required (KCB: Observe_HDCP=true AND HDCP=not required) is signaled in the Key Control Block of the Content Key, then no further distribution over Wi-Fi/LAN may be allowed.

In-Vehicle Content Mirroring Use Case #4 (FIG. 4)
  e.g. Widevine L1, Dual Zone (Two Streams+Mirroring)
    Front Passenger (DP master device 300) and Rear Passengers 1, 2 and 3 (DP client devices 320, 320', 320") may be connected via LAN/Wi-Fi inside the vehicle. Data from the Content Provider 50 may come through 4G/LTE/5G modem of the Vehicle
    Front Passenger and Rear Passenger 1 are watching Movie ("Zone 1") fully synchronized (e.g. mirroring). Rear Passenger 2 and Rear Passenger 3 are watching Kids Cartoon ("Zone 2") fully synchronized (e.g. mirroring)
    Movie and Kids Cartoon are being delivered as two independent sessions/streams from the Content Provider (if allowed by provider, e.g. family account)
    Alternatively, each Zone (partition) may be receiving content from the content provider 50 using two independent accounts (independent logins may be allowed in some examples)
    Front Passenger (Server device) may mirror Audio and Video to Rear Passenger 1 (Client device) for Zone 1. Rear Passenger 2 (Server device) may mirror Audio and Video to Rear Passenger 3 (Client) for Zone 2
    Widevine L1 Decryption may happen (at blocks 383) on Front Passenger's and Rear Passenger 2's units (Servers) in TEE 380. Video decoding (at block 385) may happen on all units in TEE 380. MPEG-TS A/V Data may be re-encrypted e.g. to HDCP 2.x (version as signaled in the Key Control Block of the Content Key(s)) (e.g. at blocks 389) inside TEE 380 for further transmission. Audio may be decoded (e.g. at 384) in rich environment 360 e.g. if "key always unsecure" is signalled.

MPEG-TS Data 389' (518, 604) may be sent over Wi-Fi/LAN (local connection) encrypted to client devices 320, 320', where it is decrypted inside TEE 340 using e.g. using HDCP 2.x TA (at block 339) and handled in the same way as on server devices. This may only be done if Widevine=L1 and HDCP required (KCB: Observe_HDCP=true AND HDCP=required), then it may be encrypted MPEG-TS stream with HDCP version minimum as specified by HDCP_Version bits of the KCB.

If Widevine=L1 and HDCP not required (KCB: Observe_HDCP=true AND HDCP=not required) is signaled in the Key Control Block of the Content Key(s), then no further distribution over Wi-Fi/LAN is allowed.

It is to be mentioned here that all alternatives or aspects as discussed before and all aspects as defined by independent claims in the claims can be used individually, i.e., without any other alternative or object than the contemplated alternative, object or independent claim. However, in other embodiments, two or more of the alternatives or the aspects or the independent claims can be combined with each other and, in other embodiments, all aspects, or alternatives and all independent claims can be combined to each other.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

For example, a distributed playback, DP, method (e.g. performed by the DP master device) may comprise:

establishing a local connection (520, 60, 61, 62) with a plurality of DP client devices (600, 650, 120, 120', 120", 320, 320', 320");

establishing a remote connection (501, 52, 53, 54, 55) with a remote content provider (50), so as to receive a first encrypted media stream (504, 181', 381') from the remote content provider (50), wherein the encrypted media stream (504, 181', 381') is encrypted according to a first encryption standard;

decrypting the first encrypted media stream (504, 181', 381') to obtain a decrypted media stream (508);

adding DP information, DPI (510), to the decrypted media stream (508, 183', 383');

an encryptor (516, 185, 389) configured for encrypting the decrypted media stream (508, 514, 182') according to a second encryption standard to obtain a second encrypted stream (518, 189', 389'), additionally encrypting the DPI (510) in the second encrypted media stream (518, 189', 389') or adding the DPI (510) to the encrypted media stream (518, 189', 389') in plaintext, transmitting an output media stream (518, 189', 389'), which is the second encrypted media stream (518, 189', 389'), to the plurality of DP client devices (120-120").

Another distributed playback, DP, method (e.g. performed by the DP client devices) may comprise establishing a local connection (520, 60) with a DP master device (500, 100, 101, 300, 301), so as to receive an encrypted media stream (604, 189', 389') from the DP master device (500, 100, 101, 300, 301), the decrypted media stream (604, 189', 389') including payload data and DP information, DPI (510);

decrypting the encrypted media stream (604, 189', 389') to obtain a decrypted media stream (608) to obtain a decrypted media stream (608);

extracting the DPI (510) in the decrypted media stream (608, 339', 343") or in the encrypted media stream (604, 189', 389');

decoding the decrypted media stream (608, 339', 343) using the DPI (510).

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A distributed playback, DP, master device, comprising:
a communication interface configured for establishing a local connection with a plurality of DP client devices and for establishing a remote connection with a remote content provider, so as to receive a first encrypted media stream from the remote content provider, wherein the first encrypted media stream is encrypted according to a first encryption standard, wherein the first encrypted media stream comprises at least one audio stream and at least one video stream;
a decryptor configured for decrypting the first encrypted media stream to acquire a decrypted media stream;
a DP information, DPI, adder configured for adding DPI to the decrypted media stream,
an encryptor configured for encrypting the decrypted media stream according to a second encryption standard to acquire a second encrypted stream, wherein the second encryption standard is the same as, or different from, the first encryption standard,
wherein the DP master device is configured for additionally encrypting the DPI in the second encrypted media stream or adding the DPI to the second encrypted media stream in plaintext,
wherein the communication interface is configured for transmitting an output media stream, which is the second encrypted media stream, to the plurality of DP client devices,
wherein the DP master device comprises a trusted environment and a non-trusted environment, wherein the trusted environment comprises a level of security which is greater than the level of security of the non-trusted environment, wherein the decryptor and the encryptor are in the trusted environment,
the DP master device further comprising an embedded media renderer which comprises a trusted renderer portion in the trusted environment and a non-trusted renderer portion in the non-trusted environment, so that a first media content, which is video content, is rendered by the trusted renderer portion and a second media content, which is audio content, is rendered by the non-trusted environment, wherein the first media content and the second media content are decoded from the decrypted media stream,
wherein the first media content is synchronized to the second media content through the DPI.

2. The DP master device of claim 1, wherein the communication interface is in the non-trusted environment.

3. The DP master device of claim 1, wherein the trusted environment comprises an internal trusted decoder configured to decode the decrypted encoded media stream.

4. The DP master device of claim 1, further comprising buffers in the trusted environment for receiving the decrypted media stream, for providing the decrypted media stream to the encryptor, and to provide the second encrypted media stream to the non-trusted environment.

5. The DP master device of claim 4, wherein the buffers in the trusted environment are also configured to provide a portion of the decrypted media stream to be decoded within the trusted environment and to provide another portion of the decrypted media stream to be decoded in the non-trusted environment.

6. The DP master device of claim 1, wherein the DPI comprises timing information associated with at least one frame of the decrypted media stream, the timing information providing presentation time information on the time instant of rendering of the at least one frame.

7. The DP master device of claim 6, wherein the presentation time information is provided to both the plurality of client devices and the DP master device, so as to render the media content synchronously.

8. The DP master device of claim 6, wherein the presentation time information is provided in a payload packet.

9. The DP master device of claim 6, wherein the timing information provides information on the time instant in which the at least one frame is scheduled according to the DP master device.

10. The DP master device of claim 6, wherein the timing information provides the timing of the rendering of the at least one frame, so as to synchronize the rendering at the DP client devices based on the timing of the rendering of the at least one frame.

11. The DP master device of claim 6, wherein the timing information provides the timing of the rendering of the at least one frame, as scheduled for the future at the time instant in which the timing information is written in the output media stream, so as synchronize the rendering at the DP client devices based on the timing of the rendering of the at least one frame.

12. The DP master device of claim 1, the DPI further comprising latency information associated with at least one DP client device, so as to synchronize the rendering at the at least one DP client device.

13. The DP master device of claim 1, wherein the DPI provides information on the current playback speed as defined by the master device, so as to synchronize the rendering at at least one DP client device.

14. The DP master device of claim 1, wherein the DPI is provided in a beacon packet which comprises no payload.

15. The DP master device of any of claim 1, wherein the DPI is provided in a payload packet of the output media stream.

16. The DP master device of claim 1, wherein the at least some information of the DPI provided to the embedded media renderer actuates a control on a delay of the rendering of the embedded media renderer, so that:
in case the latency of the rendering at at least a predetermined number of client devices is increased, then the control causes the delay of the rendering at the embedded media renderer to be increased, and
in case the latency of the rendering at at least a predetermined number of client devices is reduced, then the control causes the delay of the rendering at the embedded media renderer to be reduced or maintained.

17. The DP master device of claim 6, configured to define the presentation time information based on feedback from at least one DP client device.

18. The DP master device of claim 17, wherein the feedback comprises, or permits to infer, information on the reproduction status at at least one DP client device.

19. The DP master device of claim 18, wherein the information on the reproduction status comprises information on which frame of the output media stream is being rendered at the at least one DP client device at the time in which a feedback packet is sent by the at least one DP client device.

20. The DP master device of claim 18, configured to infer information on the reproduction status from the timing of the reception of the feedback packet sent by the at least one DP client device, so as to infer the latency of the at least one DP client device.

21. The DP master device of claim 20, configured to infer the information on the reproduction status by analyzing a roundtrip time between a packet sent by the DP master device and a feedback packet received from the at least one DP client device in response to the packet sent by the DP master device, thereby inferring the latency of the at least one DP client device.

22. The DP master device of claim 1, configured to encode the DPI in at least one payload packet of the output media stream sent in the local connection.

23. The DP master device of claim 1, wherein the first standard is a Widevine standard, wherein the second encryption standard is a high-bandwidth digital content protection, HDCP, standard.

24. A distributed playback, DP, method comprising:
establishing a local connection with a plurality of DP client devices;
establishing a remote connection with a remote content provider, so as to receive a first encrypted media stream from the remote content provider, wherein the first encrypted media stream is encrypted according to a first encryption standard, wherein the first encrypted media stream comprises at least one audio stream and at least one video stream;
decrypting the first encrypted media stream to acquire a decrypted media stream;
adding DP information, DPI, to the decrypted media stream;
an encryptor configured for encrypting the decrypted media stream according to a second encryption standard to acquire a second encrypted stream,
additionally encrypting the DPI in the second encrypted media stream or adding the DPI to the second encrypted media stream in plaintext,
transmitting an output media stream, which is the second encrypted media stream, to the plurality of DP client devices,
the method using an embedded media renderer which comprises a trusted renderer portion in the trusted environment and a non-trusted renderer portion in the non-trusted environment, so that a first media content, which is video content, is rendered by the trusted renderer portion, and a second media content, which is audio content, is rendered by the non-trusted environment, wherein the first media content and the second media content are decoded from the decrypted media stream, wherein the first media content is synchronized to the second media content through the DPI,
wherein encrypting is performed within the trusted environment.

* * * * *